(12) United States Patent
Marastoni et al.

(10) Patent No.: US 10,800,089 B2
(45) Date of Patent: Oct. 13, 2020

(54) DEVICE FOR UNLOADING AND STORING PREFORMS FOR THE PRODUCTION OF CONTAINERS MADE OF PLASTICS

(71) Applicant: SACMI IMOLA S.C., Imola (IT)

(72) Inventors: Daniele Marastoni, San Giovanni in Persiceto (IT); Lorenzo Mimmi, Imola (IT); Nicola Andreatta, Crespano del Grappa (IT)

(73) Assignee: SACMI IMOLA S.C., Imola (IT)

( * ) Notice: Subject to any disclaimer, the term of this patent is extended or adjusted under 35 U.S.C. 154(b) by 244 days.

(21) Appl. No.: 15/326,893

(22) PCT Filed: Jul. 15, 2015

(86) PCT No.: PCT/EP2015/066178
§ 371 (c)(1),
(2) Date: Jan. 17, 2017

(87) PCT Pub. No.: WO2016/008928
PCT Pub. Date: Jan. 21, 2016

(65) Prior Publication Data
US 2017/0203493 A1  Jul. 20, 2017

(30) Foreign Application Priority Data

Jul. 17, 2014 (IT) .............................. VR2014A0184

(51) Int. Cl.
*B29C 49/42* (2006.01)
*B29C 49/64* (2006.01)
(Continued)

(52) U.S. Cl.
CPC ...... *B29C 49/4205* (2013.01); *B29C 49/6427* (2013.01); *B29C 49/08* (2013.01);
(Continued)

(58) Field of Classification Search
CPC . B29C 49/4205; B29C 49/6427; B29C 49/08; B29C 2049/4221;
(Continued)

(56) References Cited

U.S. PATENT DOCUMENTS 4,582,353 A * 4/1986 Alvernhe ............. B25J 15/0616
294/189
4,592,719 A * 6/1986 Bellehache ......... B29C 45/4225
34/428
(Continued)

FOREIGN PATENT DOCUMENTS

CN 102950755 A 3/2013
CN 203697416 U 7/2014
(Continued)

OTHER PUBLICATIONS

International Search Report dated Oct. 12, 2015 re: Application No. PCT/EP2015/066178; pp. 1-3; citing: WO 2005/037521 A1 and EP 0 158 105 A1.
(Continued)

*Primary Examiner* — Xiao S Zhao
*Assistant Examiner* — Emmanuel S Luk
(74) *Attorney, Agent, or Firm* — Cantor Colburn LLP

(57) ABSTRACT

A device for unloading and storing preforms for the production of containers made of plastics includes at least one cooling plate that defines a plurality of receptacles for respective preforms and a component for transferring the still-hot preforms from an injection molding device to the cooling plate. The device includes pick-up components adapted to pick up the preforms from the cooling plate and place them inside at least one accommodation container.

13 Claims, 25 Drawing Sheets

(51) Int. Cl.
*B29C 49/08* (2006.01)
*B29C 45/72* (2006.01)

(52) U.S. Cl.
CPC ............... *B29C 2045/7235* (2013.01); *B29C 2045/7242* (2013.01); *B29C 2049/4221* (2013.01)

(58) Field of Classification Search
CPC .... B29C 2045/7214; B29C 2045/7235; B29C 2045/7242; B29C 45/4225; B29C 2045/4266; B29C 45/7207
See application file for complete search history.

(56) References Cited

U.S. PATENT DOCUMENTS

| | | | | |
|---|---|---|---|---|
| 4,721,452 A * | 1/1988 | Delfer, III | ............ | B29C 45/4225 264/328.14 |
| 4,729,732 A * | 3/1988 | Schad | ................ | B29C 45/7207 264/348 |
| 4,880,581 A * | 11/1989 | Dastoli | .................... | A61L 9/16 264/39 |
| 4,915,611 A * | 4/1990 | Brown | ................ | B29C 45/1769 425/438 |
| RE33,237 E * | 6/1990 | Delfer, III | ............ | B29C 45/4225 264/328.14 |
| 4,946,551 A | 8/1990 | Ishige et al. | | |
| 4,987,673 A * | 1/1991 | Kogura | ................. | F24F 3/1607 29/564 |
| 5,015,425 A * | 5/1991 | Mimata | .................... | H01L 21/02 264/39 |
| 5,060,368 A * | 10/1991 | Chen | .................... | B29C 45/006 29/434 |
| 5,114,327 A * | 5/1992 | Williamson | ............ | B29C 35/16 264/37.18 |
| 5,141,430 A * | 8/1992 | Maus | ................ | B29C 45/1701 425/437 |
| 5,206,039 A * | 4/1993 | Valyi | ...................... | B29C 49/28 198/468.3 |
| 5,447,426 A * | 9/1995 | Gessner | ............. | B29C 45/4225 249/68 |
| 5,653,934 A * | 8/1997 | Brun, Jr. | ................. | B29C 33/30 264/334 |
| 5,687,542 A * | 11/1997 | Lawecki | ............. | B29C 45/0084 264/232 |
| 5,772,951 A * | 6/1998 | Coxhead | ................. | B29C 31/00 264/532 |
| 5,829,222 A * | 11/1998 | Schlagel | ............. | B65B 25/008 53/54 |
| 5,855,932 A * | 1/1999 | Bright | ..................... | B29C 45/42 425/438 |
| 5,865,010 A * | 2/1999 | Sundby | ................. | B65B 55/027 53/167 |
| 5,980,184 A * | 11/1999 | Lust | ..................... | B29C 31/006 414/226.01 |
| 6,190,157 B1 * | 2/2001 | Hofstetter | ............ | B29C 45/4225 425/526 |
| 6,296,473 B1 * | 10/2001 | Ohlmann | ................. | B29C 45/7207 425/547 |
| 6,299,431 B1 * | 10/2001 | Neter | ................. | B29C 45/7207 264/348 |
| 6,391,244 B1 * | 5/2002 | Chen | ................ | B29C 45/7207 264/336 |
| 6,458,324 B1 * | 10/2002 | Schinzel | ................ | G01G 15/00 414/749.1 |
| 6,530,766 B1 * | 3/2003 | De Graaff | ........... | B29C 45/1756 425/150 |
| 6,652,262 B2 * | 11/2003 | Kroeger | ................. | B29C 45/42 414/226.02 |
| 6,916,168 B2 * | 7/2005 | Romanski | ............ | B29C 45/0053 425/547 |
| 7,104,779 B2 * | 9/2006 | Howlett | ............... | B29C 45/4225 425/436 RM |
| 7,264,464 B2 * | 9/2007 | Unterlander | ........ | B29C 45/7207 425/445 |
| 7,584,591 B2 * | 9/2009 | Heinz | ....................... | A61L 2/20 53/122 |
| 7,591,975 B2 * | 9/2009 | Kintzinger | .......... | B29C 45/4225 264/538 |
| 7,670,126 B2 * | 3/2010 | McCready | .............. | B29C 45/42 137/15.22 |
| 7,780,884 B2 * | 8/2010 | Niewels | .............. | B29C 45/7207 264/340 |
| 7,832,078 B2 * | 11/2010 | Thilly | .................... | B29C 45/006 264/264 |
| 7,946,836 B2 * | 5/2011 | Sicilia | ................ | B29C 45/7207 425/139 |
| 7,971,413 B2 * | 7/2011 | Lanfranchi | ........... | B65B 61/207 53/246 |
| 8,000,837 B2 * | 8/2011 | Allen | ...................... | B65G 61/00 209/534 |
| 8,728,381 B2 * | 5/2014 | Sideris | .................... | B29C 35/16 264/328.8 |
| 2001/0038866 A1 * | 11/2001 | Giacobbe | ............ | B29C 45/7207 425/526 |
| 2003/0075838 A1 * | 4/2003 | Vardin | .................... | B29C 49/062 264/532 |
| 2003/0107155 A1 * | 6/2003 | Olaru | ...................... | B29C 45/42 264/328.1 |
| 2003/0214077 A1 * | 11/2003 | Unterlander | ........ | B29C 45/4225 264/328.8 |
| 2004/0009258 A1 * | 1/2004 | Romanski | ............ | B29C 45/4225 425/533 |
| 2004/0115302 A1 * | 6/2004 | Rommes | ................ | B29C 37/0007 425/526 |
| 2004/0247734 A1 * | 12/2004 | Unterlander | ........ | B29C 45/7207 425/528 |
| 2005/0093207 A1 * | 5/2005 | Simone | .................... | B29C 31/00 264/328.1 |
| 2005/0258795 A1 * | 11/2005 | Choi | ..................... | B29C 45/7666 318/625 |
| 2005/0281907 A1 * | 12/2005 | Rinman | .................. | B29C 31/00 425/575 |
| 2006/0138696 A1 * | 6/2006 | Weinmann | .......... | B29C 45/7207 264/237 |
| 2007/0114697 A1 * | 5/2007 | Robinson | ............ | B29C 45/2737 264/328.1 |
| 2008/0078827 A1 * | 4/2008 | Geiss | ................... | B29C 45/7686 235/375 |
| 2008/0256789 A1 * | 10/2008 | Fisch | ...................... | B29C 45/42 29/705 |
| 2010/0178149 A1 * | 7/2010 | Fritzsche | ............ | B65G 57/22 414/789.5 |
| 2011/0033569 A1 * | 2/2011 | Niewels | .............. | B29C 45/7207 425/445 |
| 2011/0064553 A1 * | 3/2011 | Lanfranchi | ......... | B29C 49/4205 414/730 |
| 2014/0004219 A1 * | 1/2014 | Cirette | .................. | B29C 31/006 425/188 |
| 2014/0331614 A1 * | 11/2014 | Czizegg | .................. | B65B 5/105 53/448 |

FOREIGN PATENT DOCUMENTS

EP       0158105 A1    10/1985
WO    2005037521 A1    4/2005

OTHER PUBLICATIONS

Written Opinion dated Oct. 12, 2015 re: Application No. PCT/EP2015/066178; pp. 1-5; citing: WO 2005/037521 A1.

* cited by examiner

DEVICE FOR UNLOADING AND STORING PREFORMS FOR THE PRODUCTION OF CONTAINERS MADE OF PLASTICS

TECHNICAL FIELD

The present disclosure relates to a device for unloading and storing preforms for the production of containers made of plastics.

BACKGROUND

Devices for unloading and storing preforms for the production of containers made of plastics are known which are usually constituted by a cooling plate that defines a plurality of receptacles arranged in a matrix and intended to accommodate respective still-hot preforms for the time required to cool them down at least partially.

Typically, these preforms are fed directly by the injection press to the cooling plate and remain in the respective receptacle for a preset time.

Specifically, once the injection process has ended, the mold opens and the cooling plate is moved toward the preforms partially accommodated in one of the two mold parts so that the receptacles can engage respective portions of preforms that emerge from the mold part in order to extract them therefrom so as to allow the mold to close and allow a new molding cycle.

The unloading of the preforms from the cooling plate occurs following an action of expulsion by pushers arranged at the bottom of the receptacles.

Following expulsion from the cooling plate by the pushers, the preforms by then already at least partially cooled fall by gravity onto a conveyor belt, which then makes them fall, again by gravity, into a container.

The solution described above, despite being widely used, is not however free from drawbacks.

First of all, the preforms, despite having undergone a certain cooling, still have some of their portions, typically the bottom one, that are not perfectly rigid, and accordingly the falls can cause localized deformations.

Moreover, the fall by gravity inside the container causes a random arrangement of the preforms that reduces in practice, the quantity of preforms that can be placed in each container.

The aim of the present disclosure is to eliminate, or at least reduce drastically, the drawbacks described above.

SUMMARY

The disclosure provides a device for unloading and storing preforms for the production of containers made of plastics that allows to unload, in an extremely practical and effective manner, the preforms from the cooling plate into the containers.

The disclosure also provides a device for unloading and storing preforms for the production of containers made of plastics that allows to accommodate, inside the containers, a greater number of preforms.

These advantages that will become better apparent hereinafter are achieved by providing a device for unloading and storing preforms for the production of containers made of plastics comprising at least one cooling plate that defines a plurality of receptacles for respective preforms and means for transferring the still-hot preforms from an injection molding device to said cooling plate, and further comprising pick-up means adapted to pick up said preforms from said cooling plate and to place said preforms inside at least one accommodation container.

BRIEF DESCRIPTION OF THE DRAWINGS

Further characteristics and advantages of the disclosure will become better apparent from the description of some preferred but not exclusive embodiments of a device for unloading and storing preforms for the production of containers made of plastics according to the disclosure, illustrated by way of non-limiting example in the accompanying drawings, wherein.

DETAILED DESCRIPTION OF THE DRAWINGS

Figure 1:
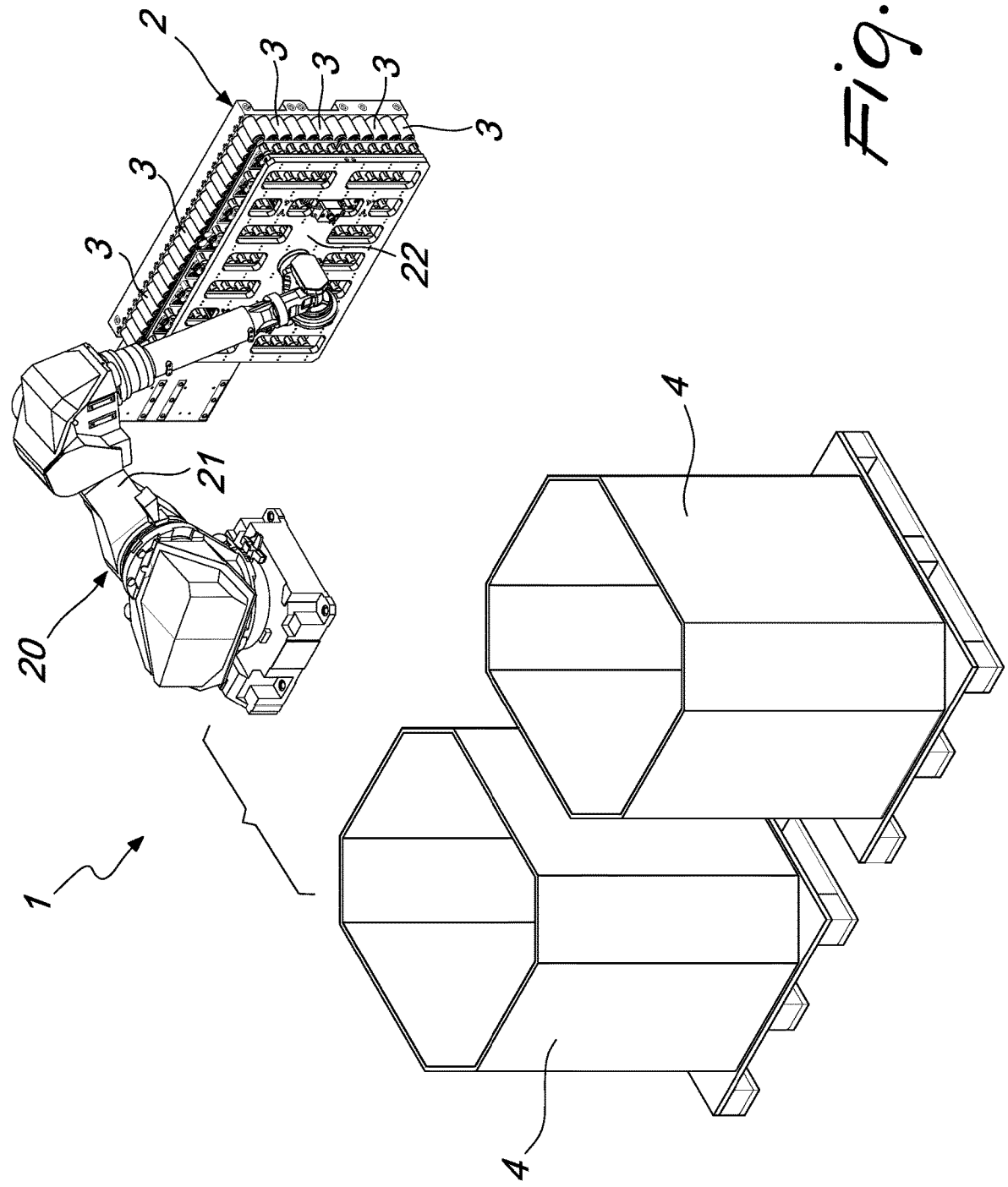
FIG. 1 is a perspective view of a device for unloading and storing preforms for the production of containers made of plastics during the step of picking up the preforms from the cooling plate.
Figure 2:
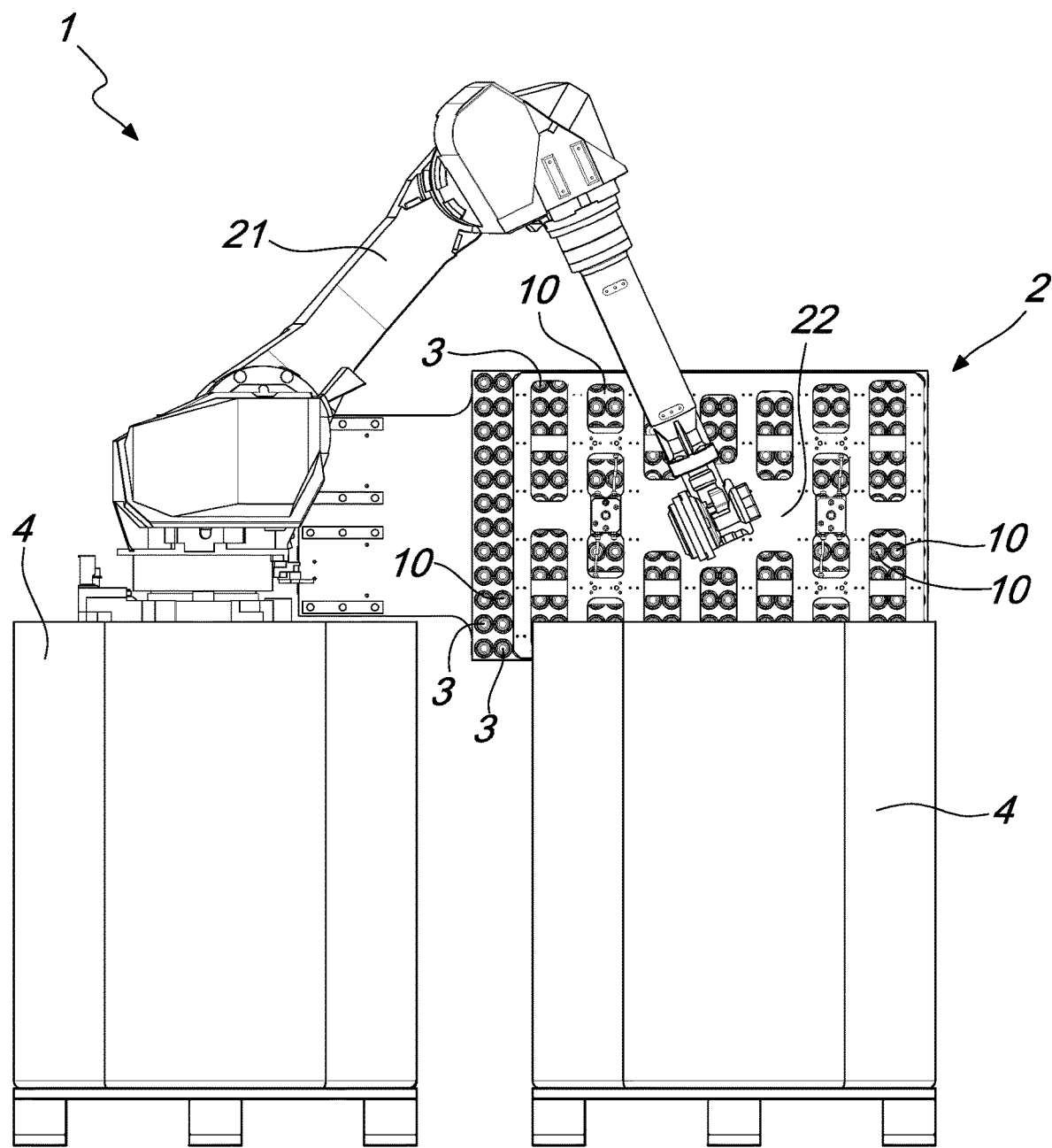
FIG. 2 is a front elevation view of the device during the pick-up step.
Figure 3:
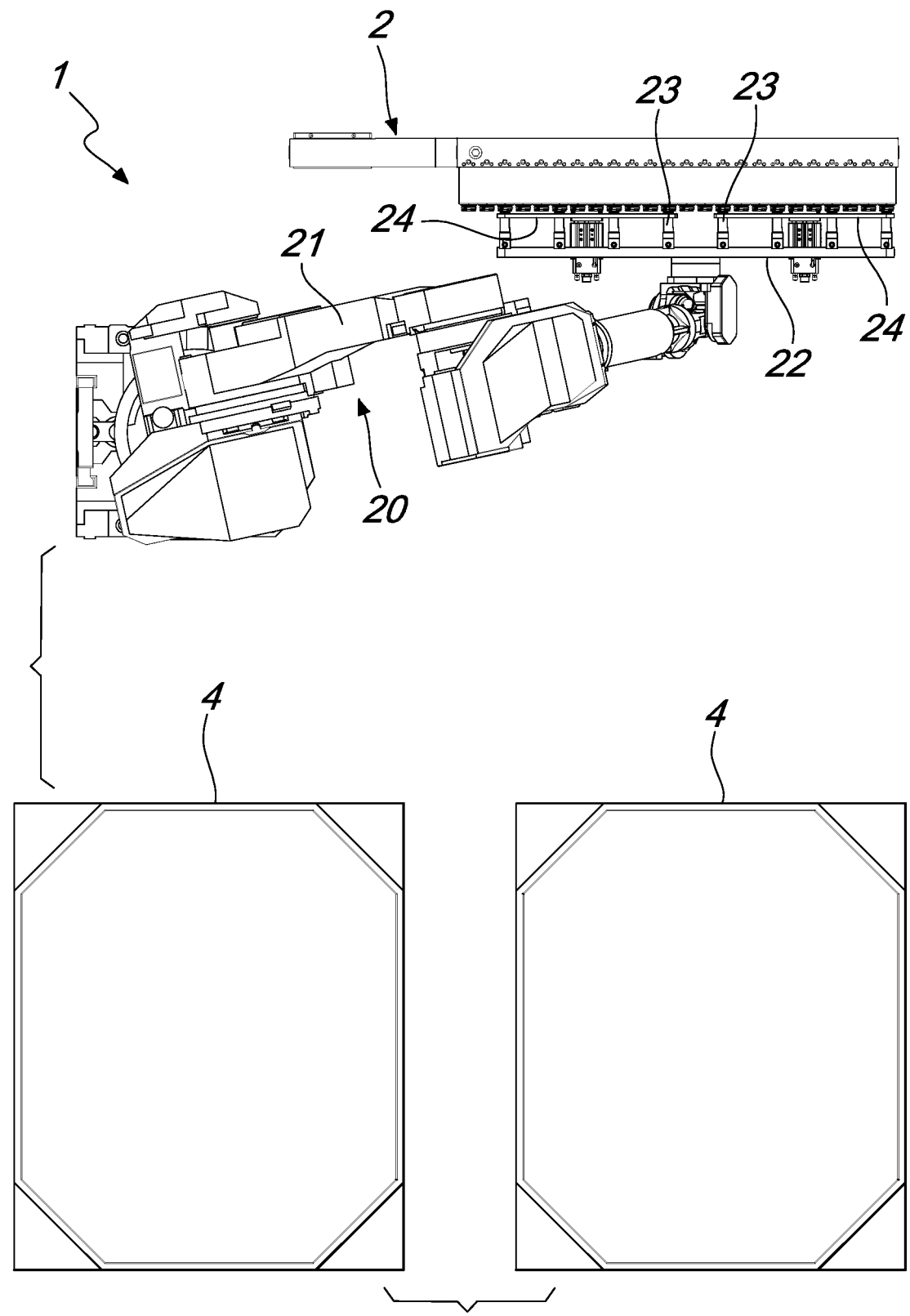
FIG. 3 is a top view of the device during the pick-up step.
Figure 4:
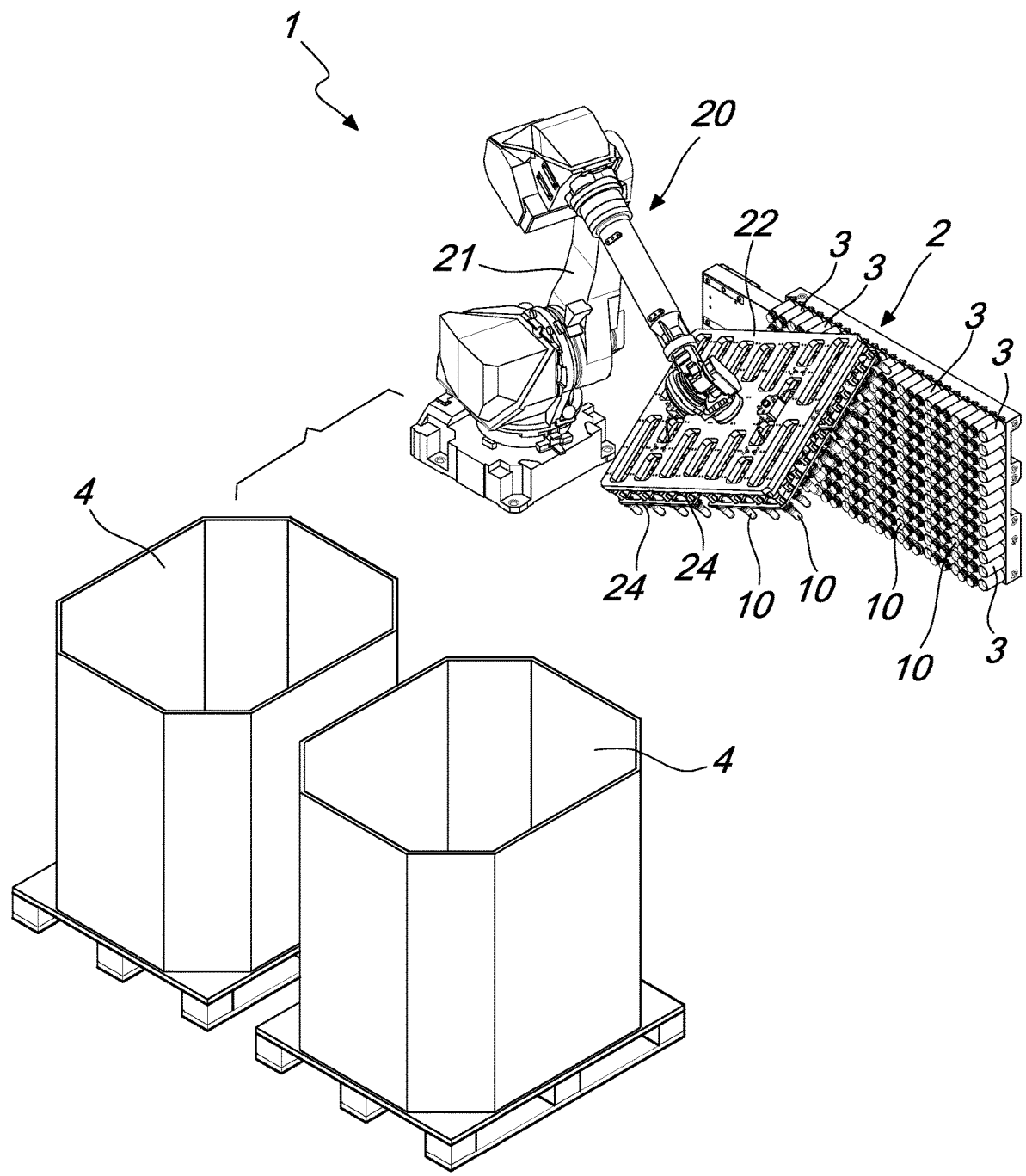
FIG. 4 is a perspective view of the device during a first intermediate step of transfer of the preforms from the cooling plate toward a container.
Figure 5:
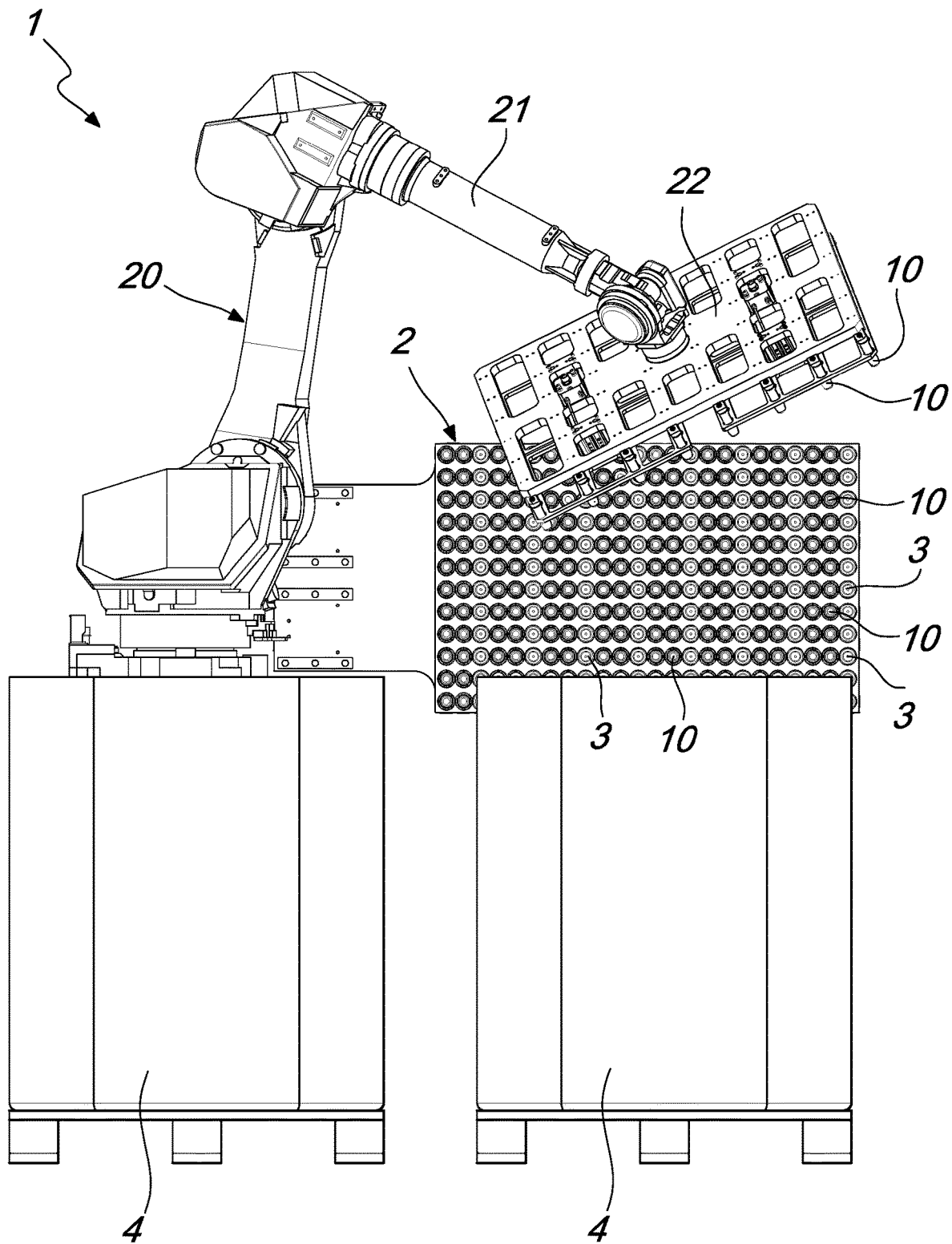
FIG. 5 is a front elevation view of the device in the first intermediate transfer step.
Figure 6:
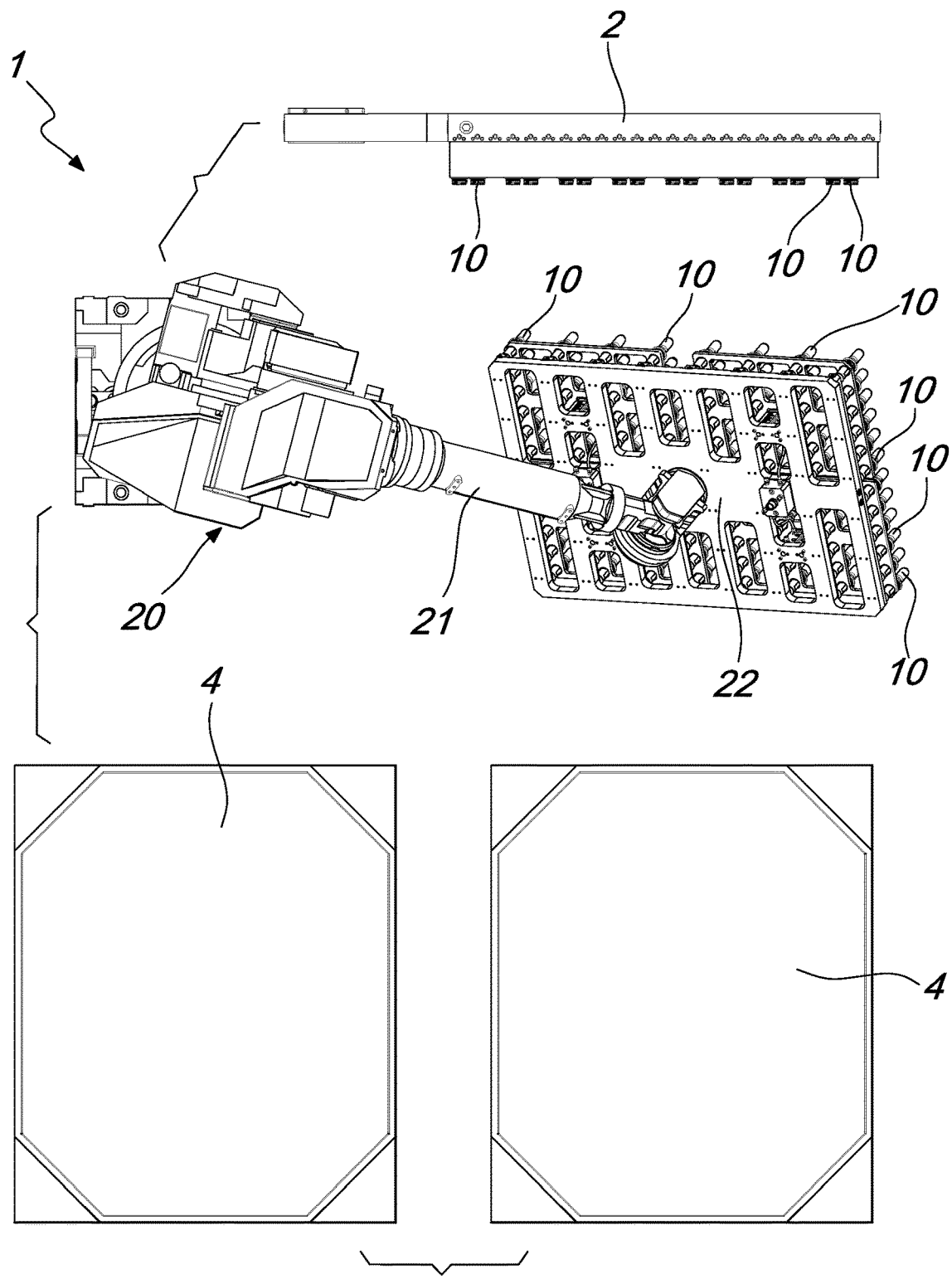
FIG. 6 is a top view of the device in the first intermediate transfer step.
Figure 7:
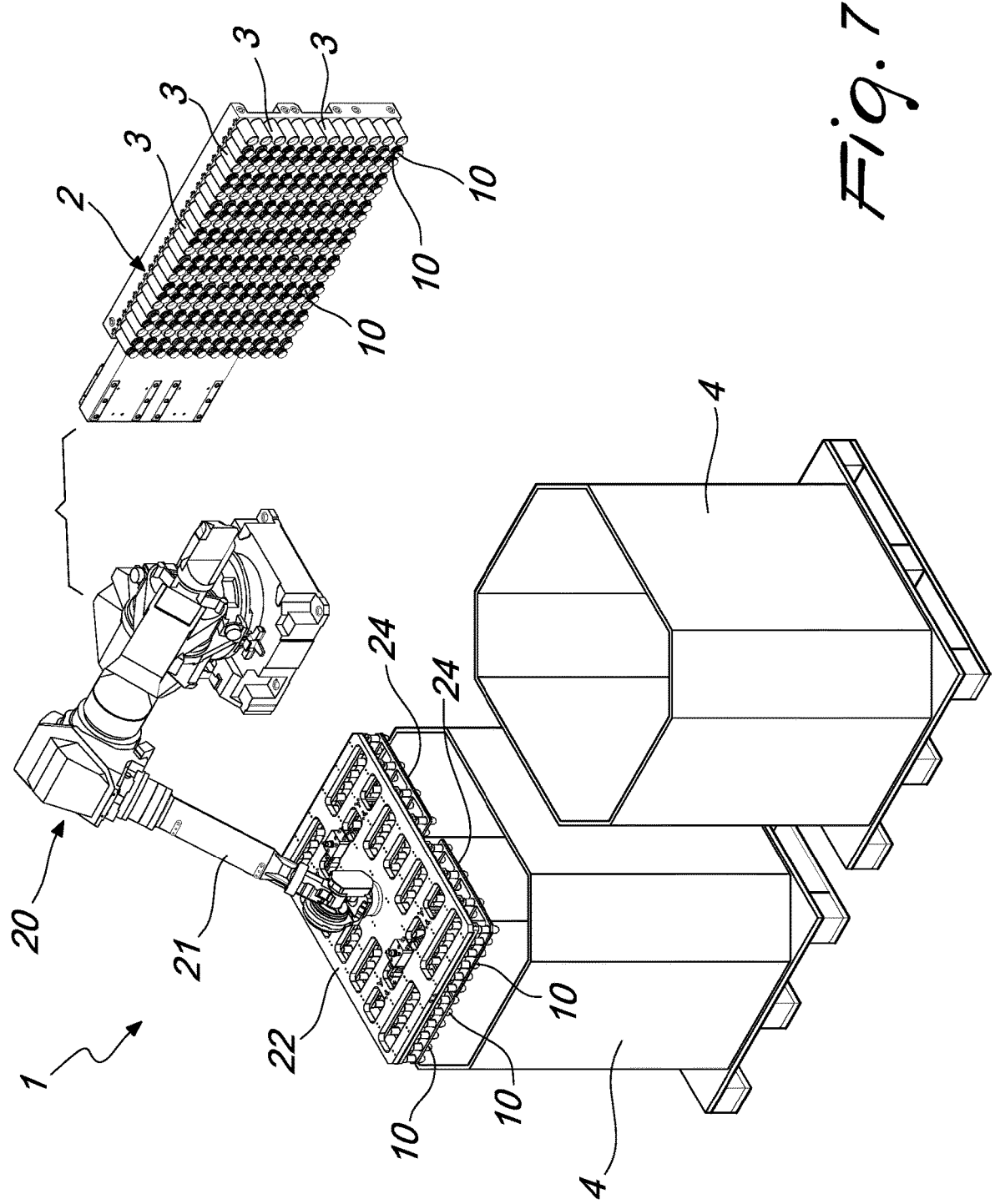
FIG. 7 is a perspective view of the device during a second intermediate step of transfer of the preforms from the cooling plate toward a container.
Figure 8:
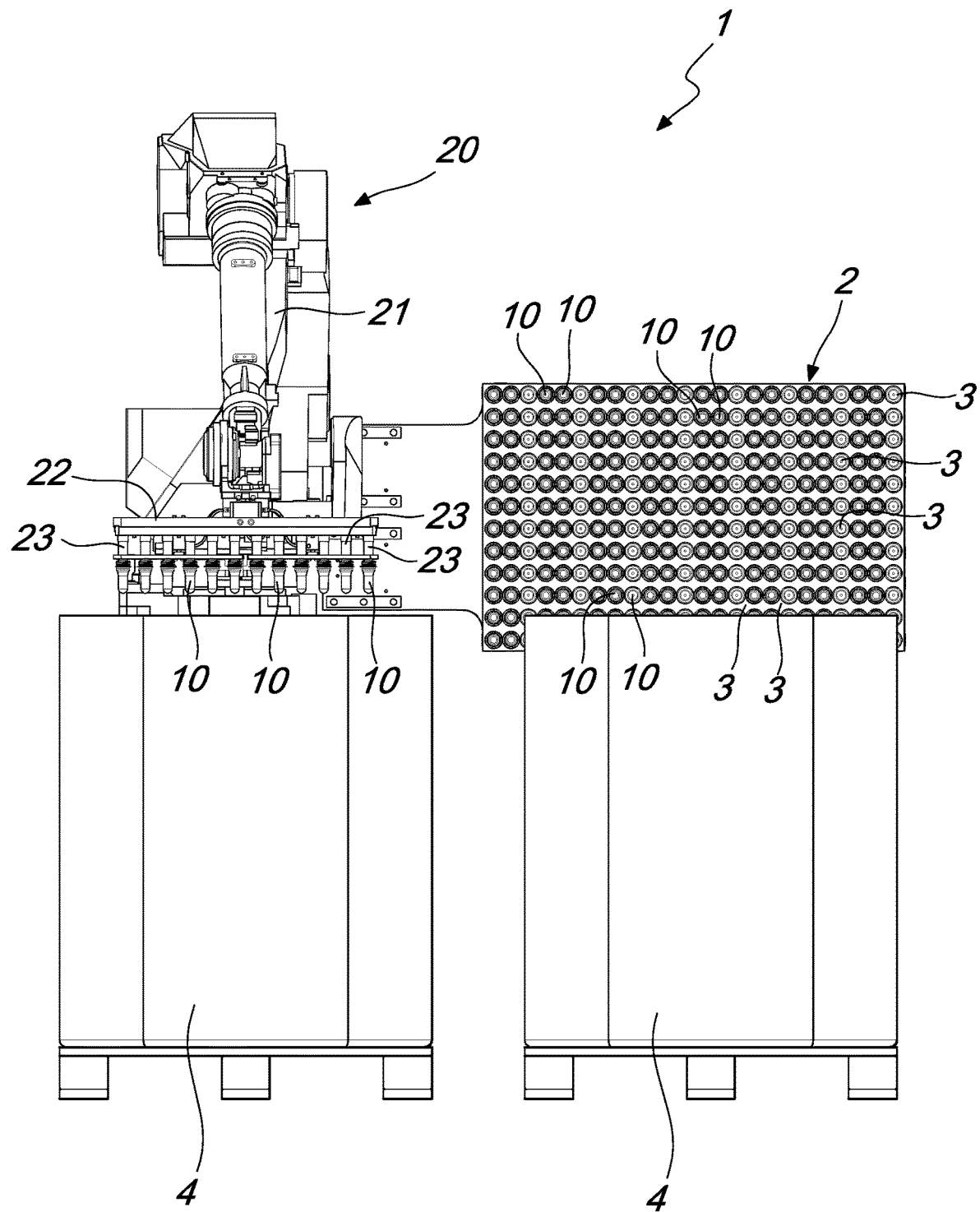
FIG. 8 is a front elevation view of the device in the second intermediate transfer step.
Figure 9:
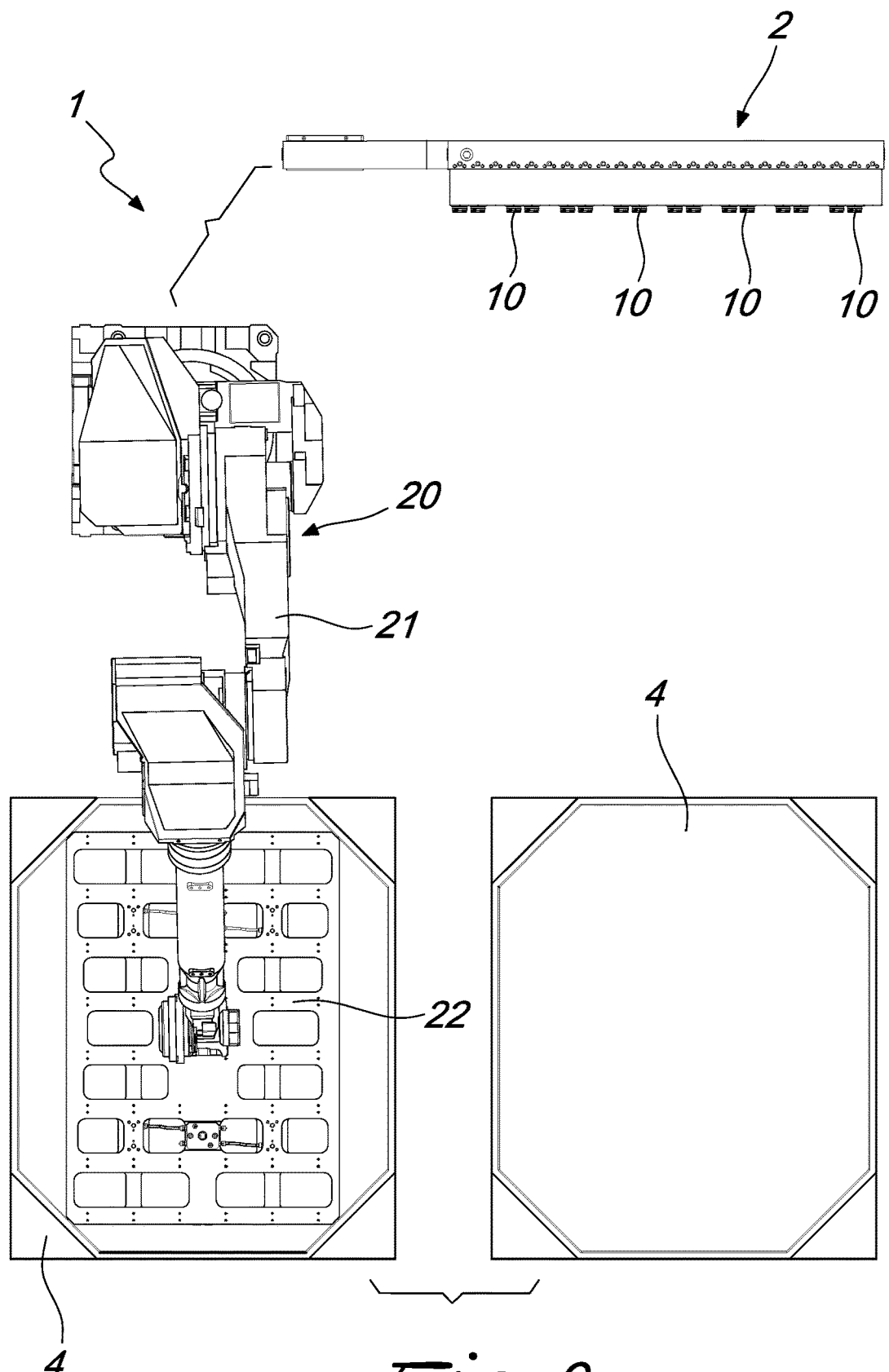
FIG. 9 is a top view of the device in the second intermediate transfer step.
Figure 10:
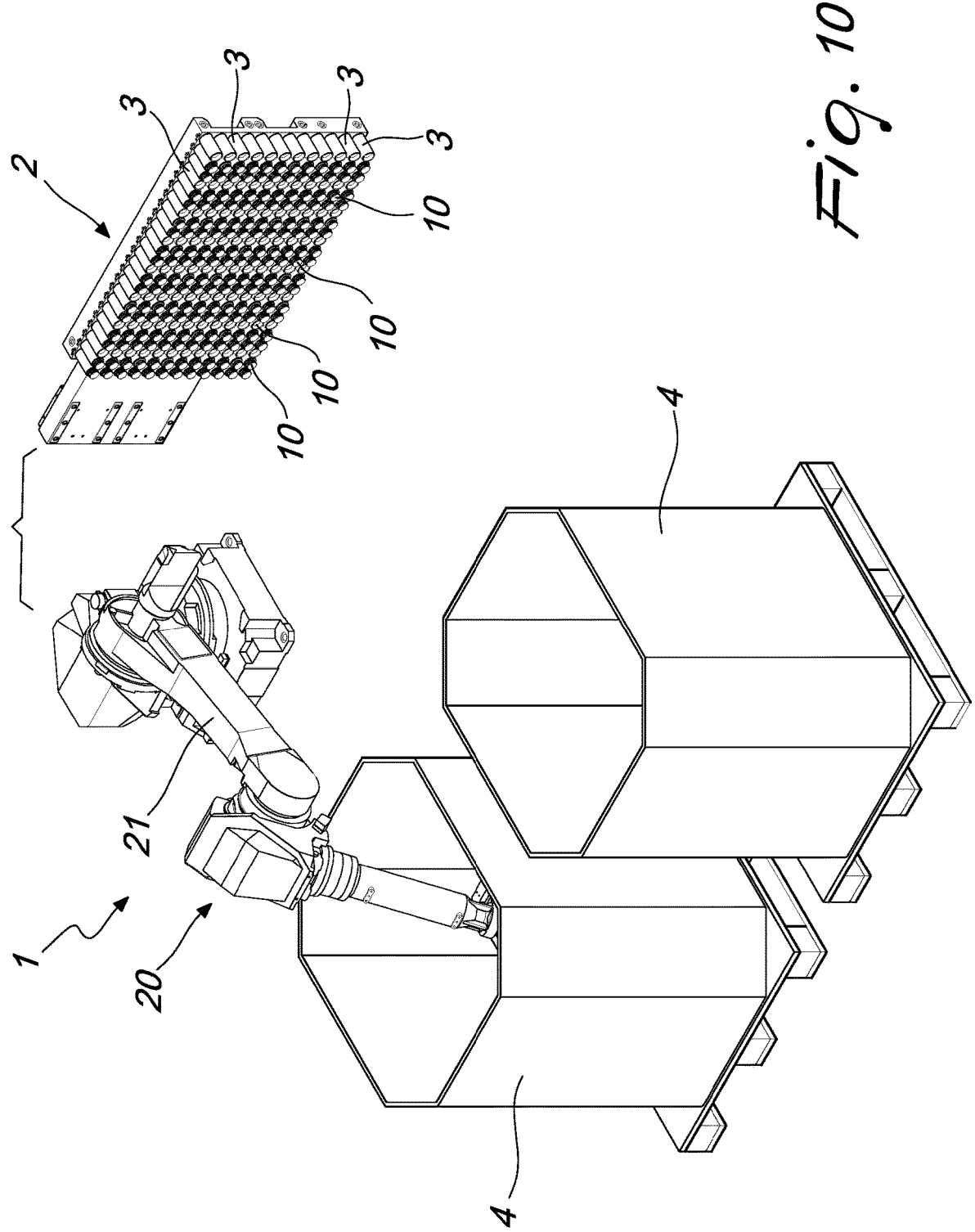
FIG. 10 is a perspective view of the device during a step for unloading the preforms into the container.
Figure 11:
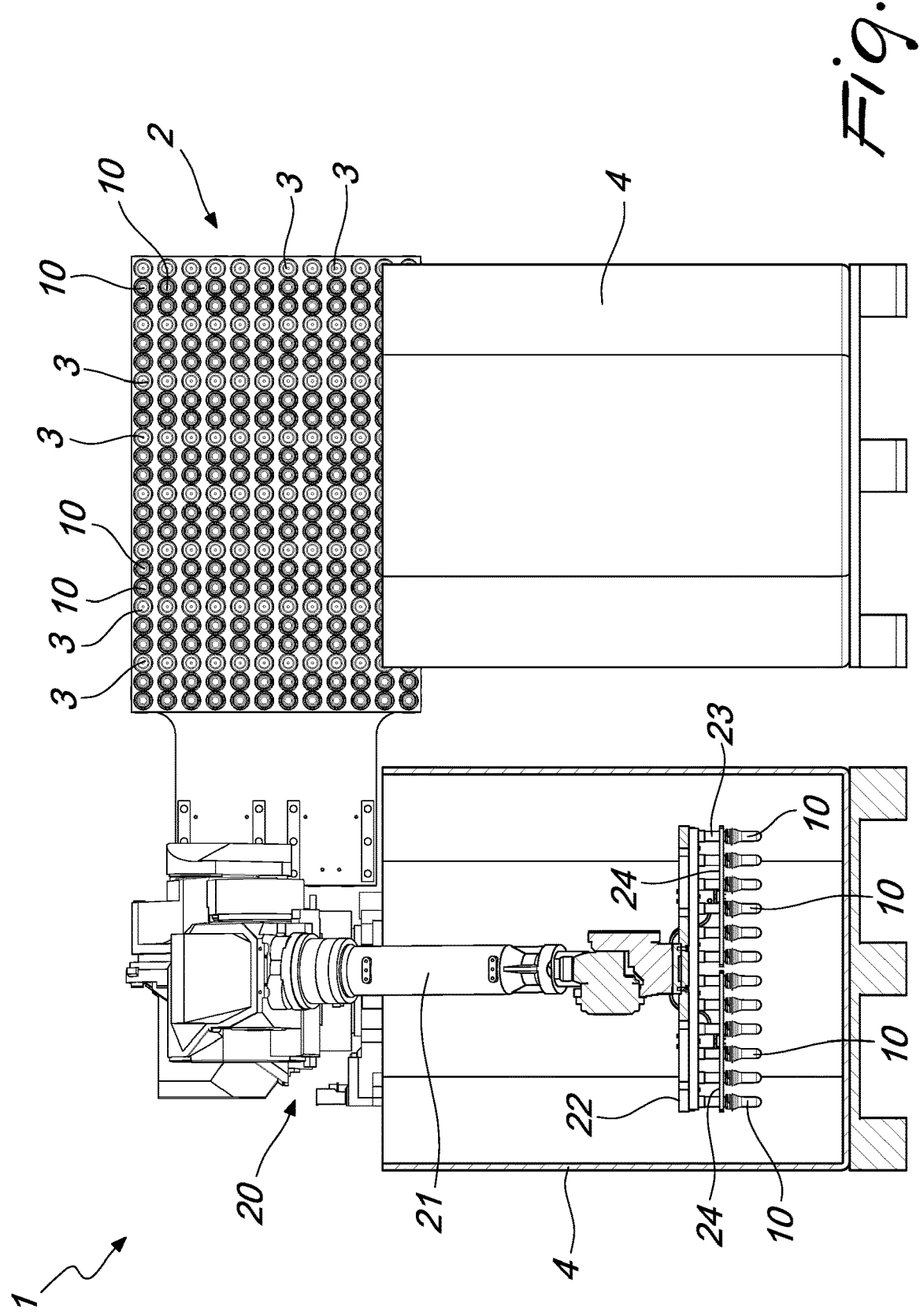
FIG. 11 is a sectional view of the device in the unloading step.
Figure 12:
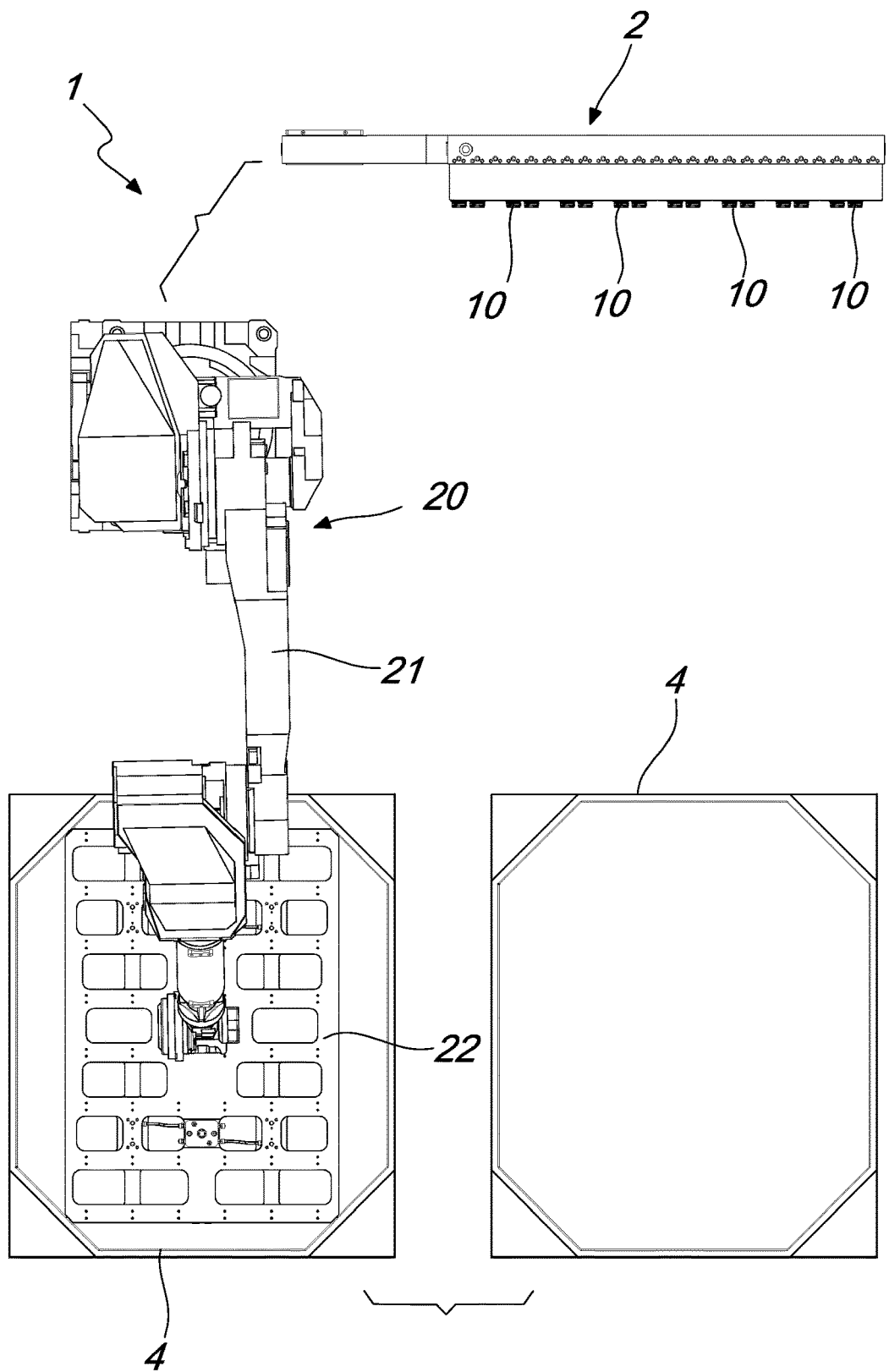
FIG. 12 is a top view of the device in the unloading step.
Figure 13:
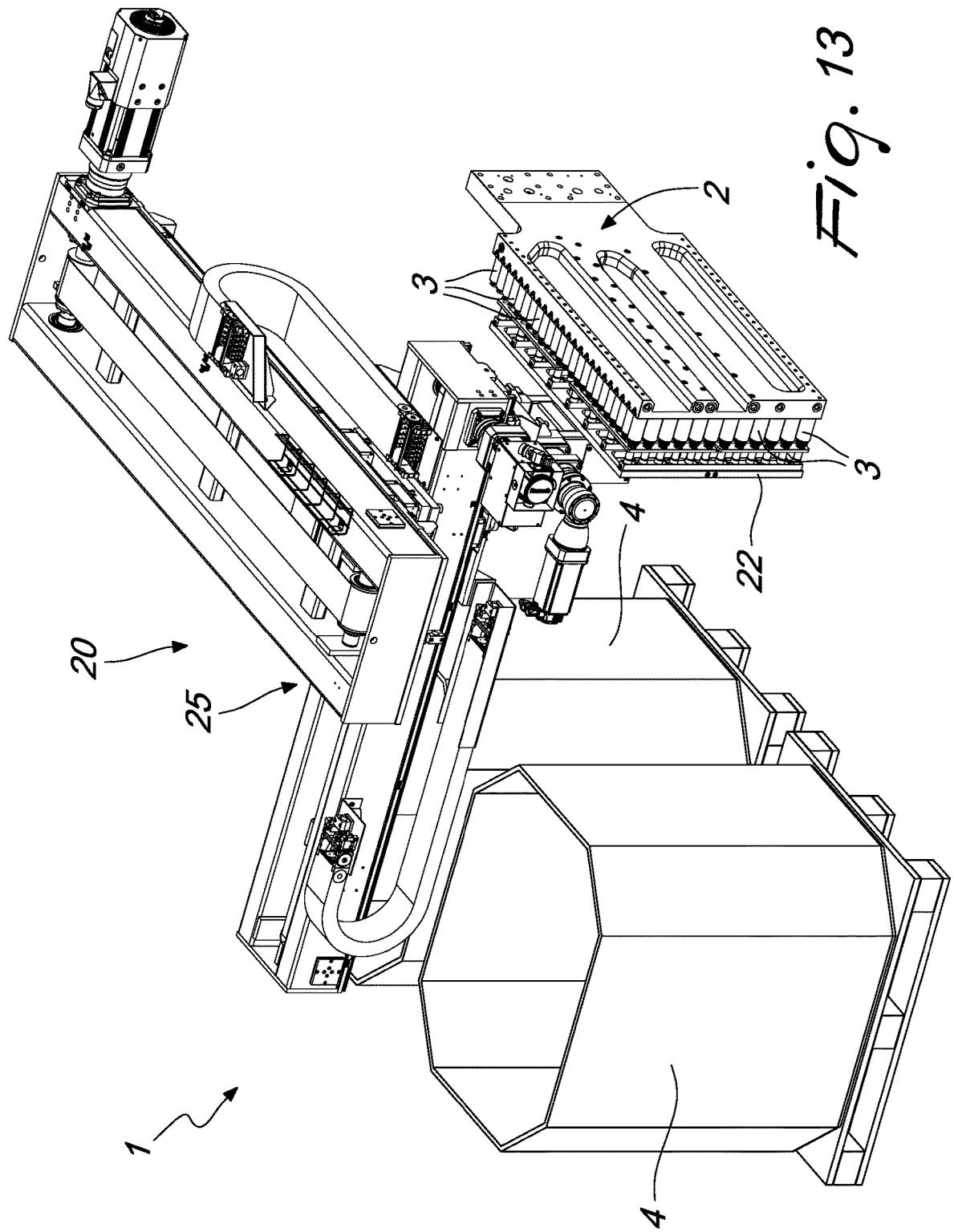
FIG. 13 is a perspective view of a constructive variation of the device during the step for pick-up of the preforms from the cooling plate.
Figure 14:
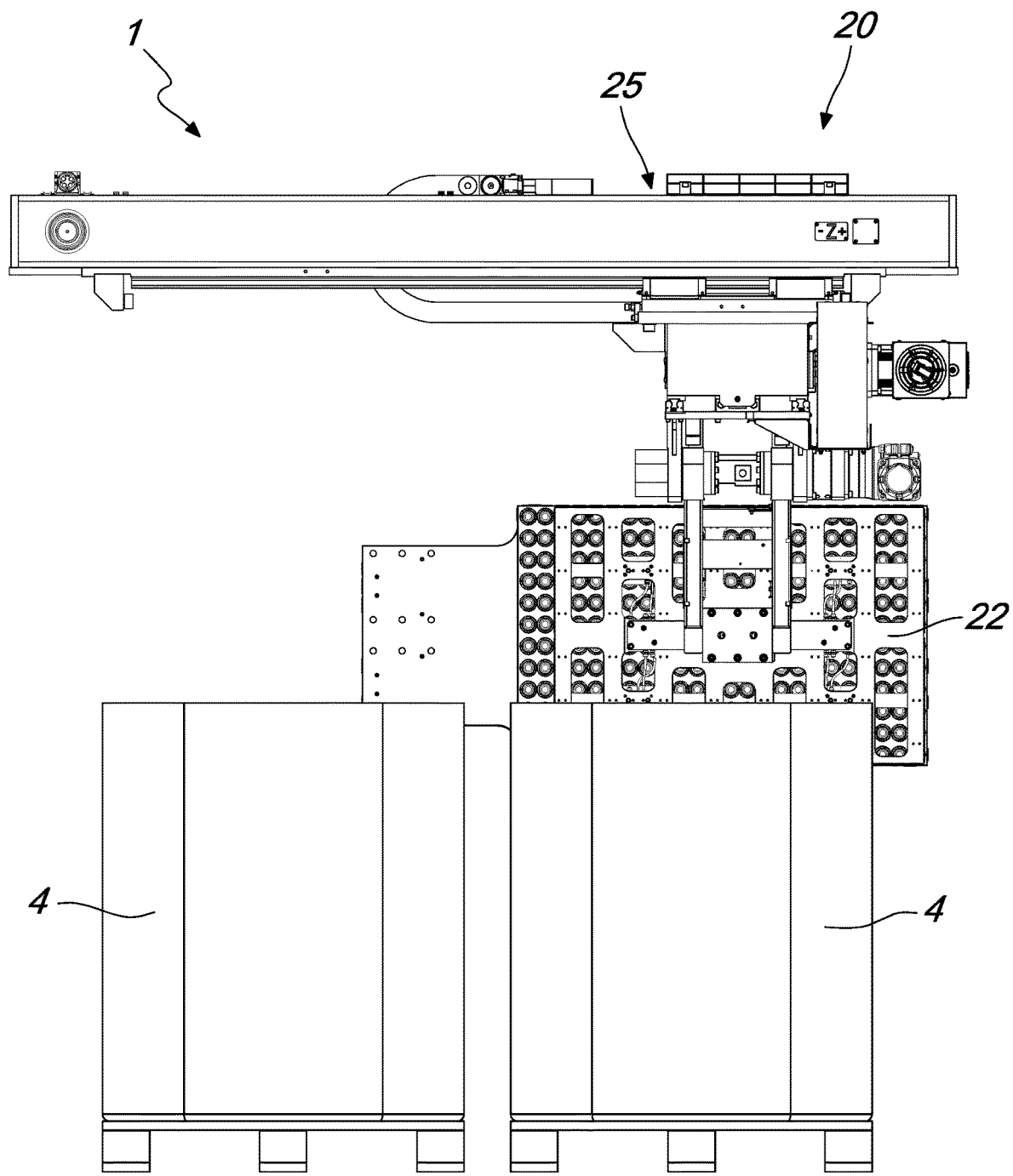
FIG. 14 is a side elevation view of the device of FIG. 13 in the pick-up step.
Figure 15:
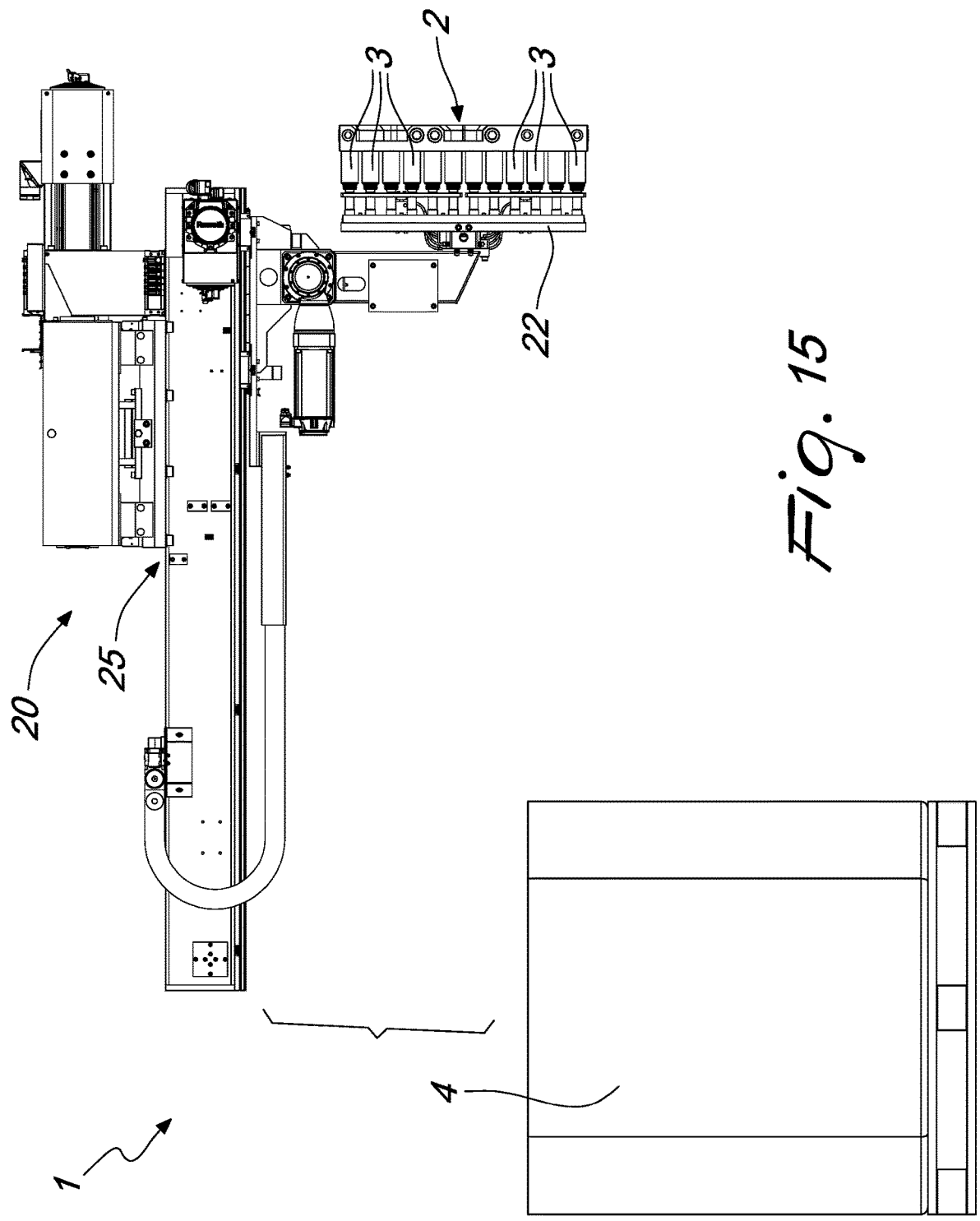
FIG. 15 is a side elevation view, from another point of view, of the device of FIG. 13 in the pick-up step.
Figure 16:
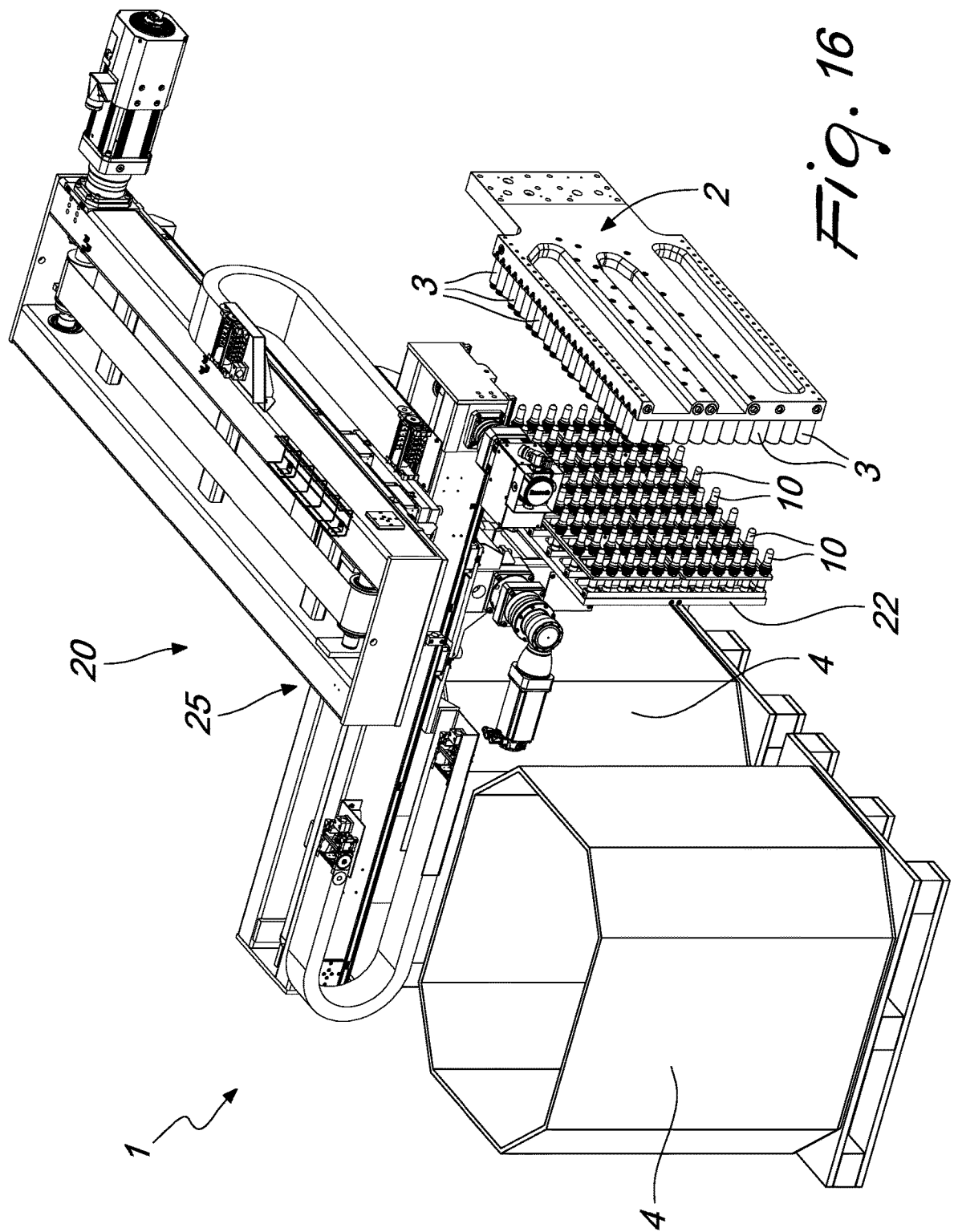
FIG. 16 is a perspective view of the variation of the device during an intermediate step of transfer of the preforms from the cooling plate toward a container.
Figure 17:
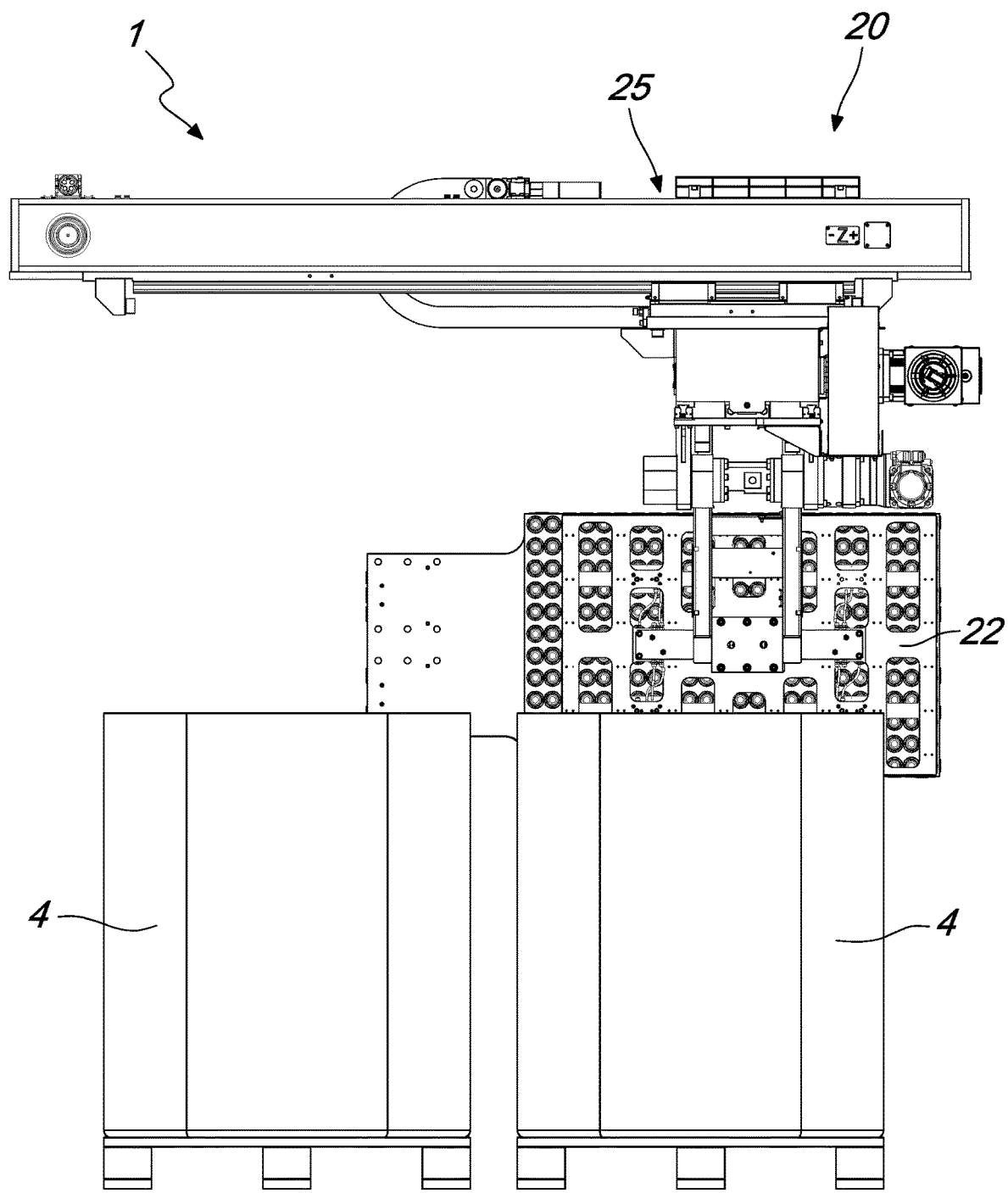
FIG. 17 is a side elevation view of the device of FIG. 16 in the intermediate transfer step.
Figure 18:
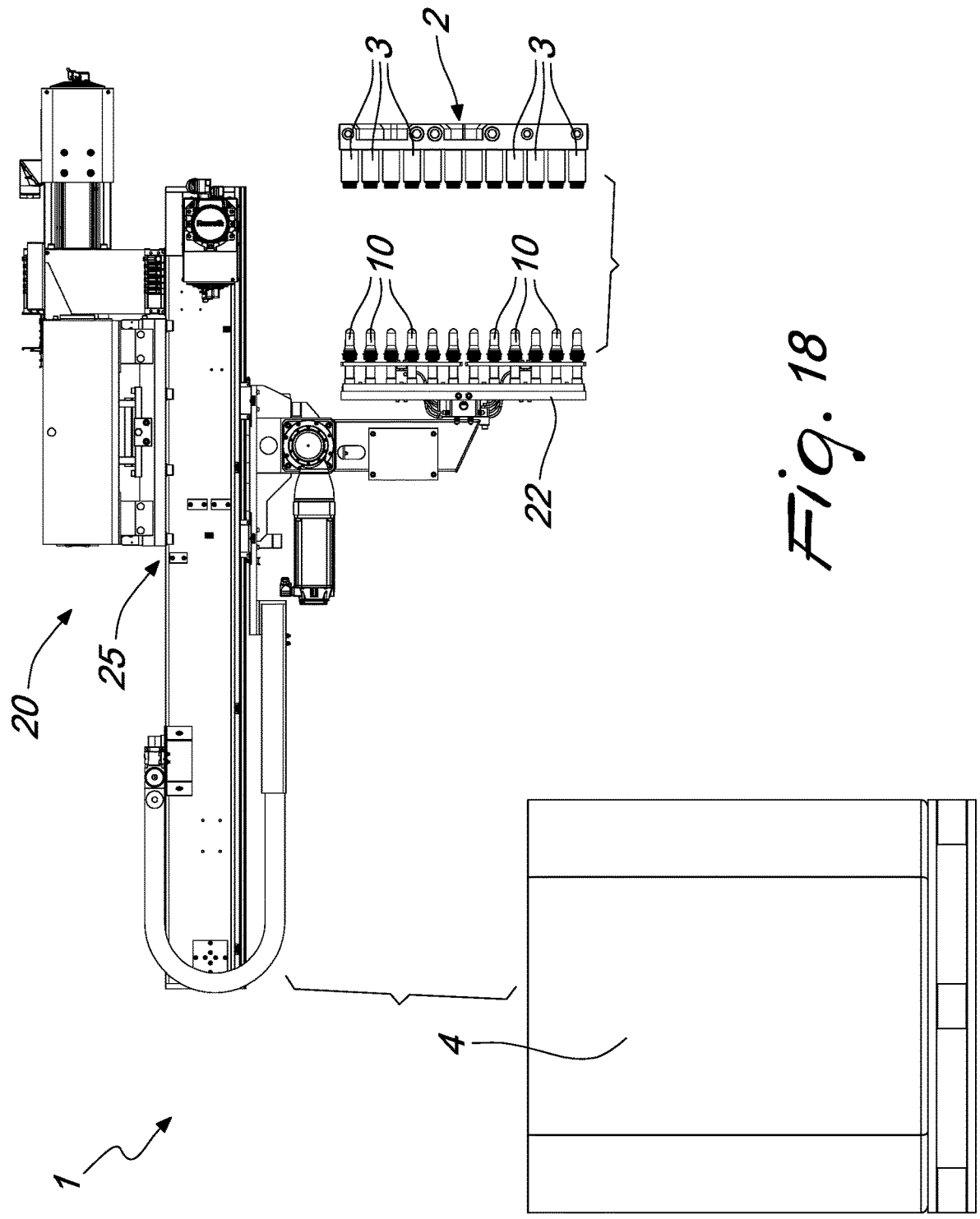
FIG. 18 is a side elevation view, from another point of view, of the device of FIG. 16 in the intermediate transfer step.
Figure 19:
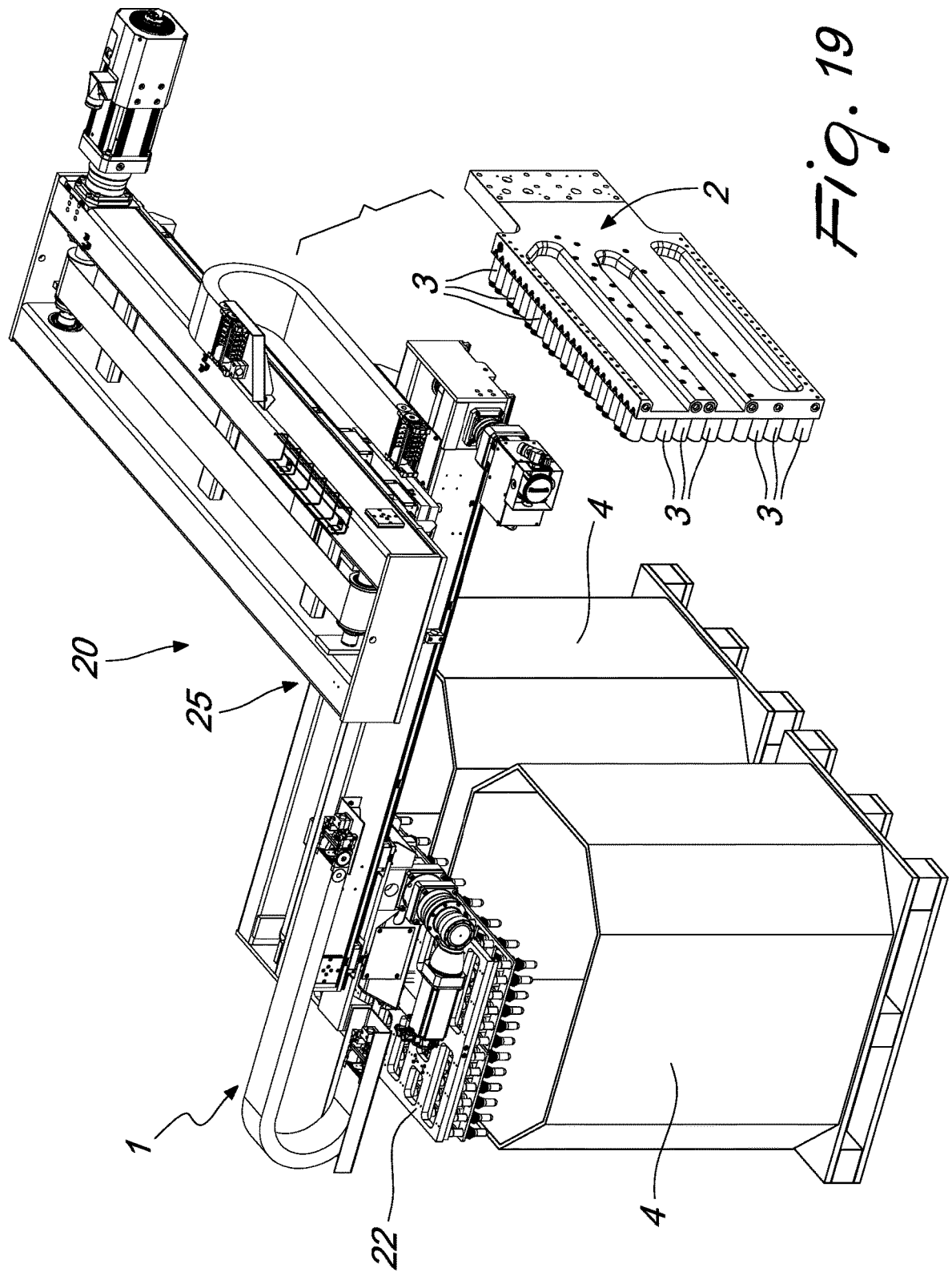
FIG. 19 is a perspective view of the variation of the device during a step for unloading the preforms into the container.
Figure 20:
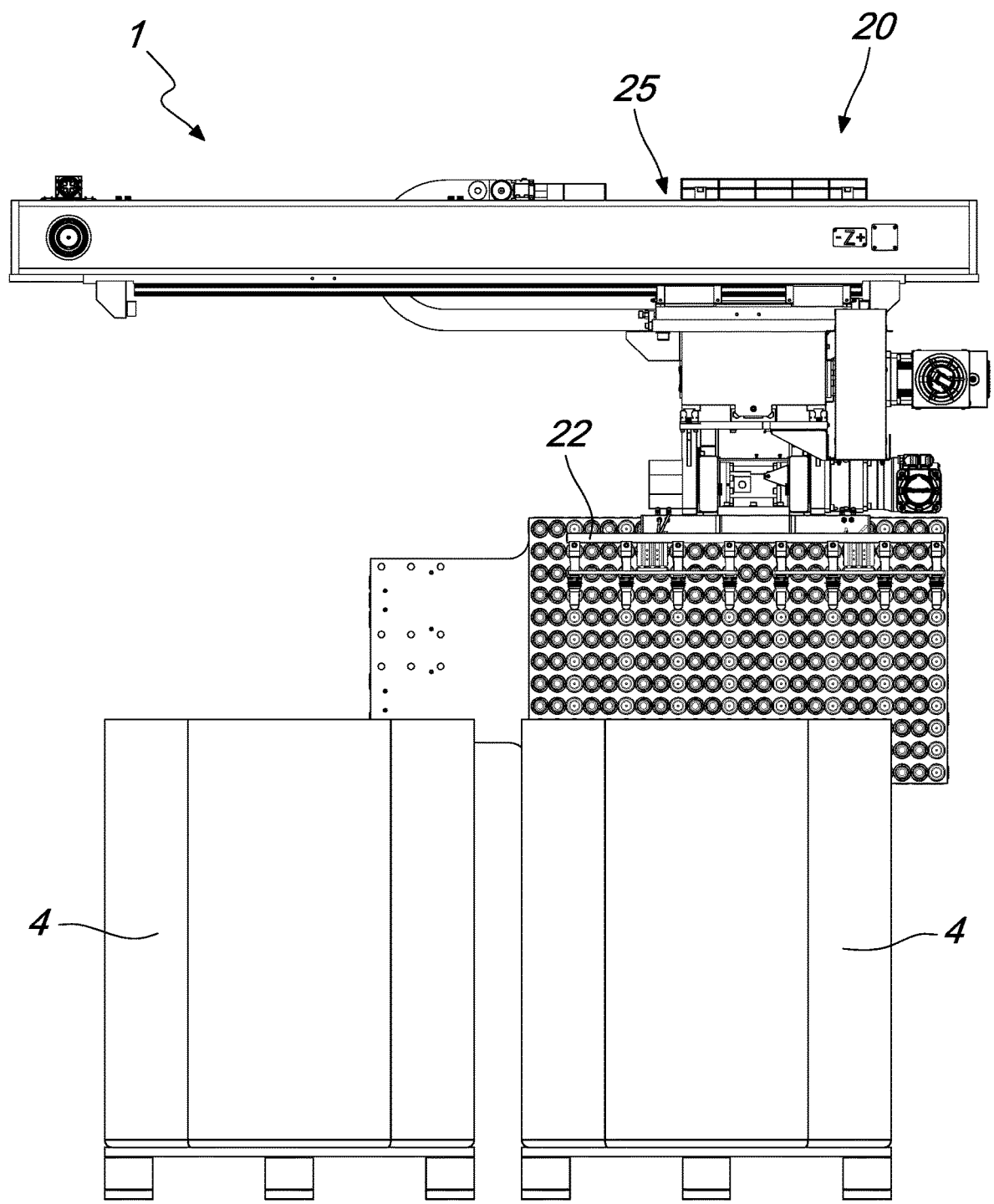
FIG. 20 is a side elevation view of the device of FIG. 19 in the unloading step.
Figure 21:
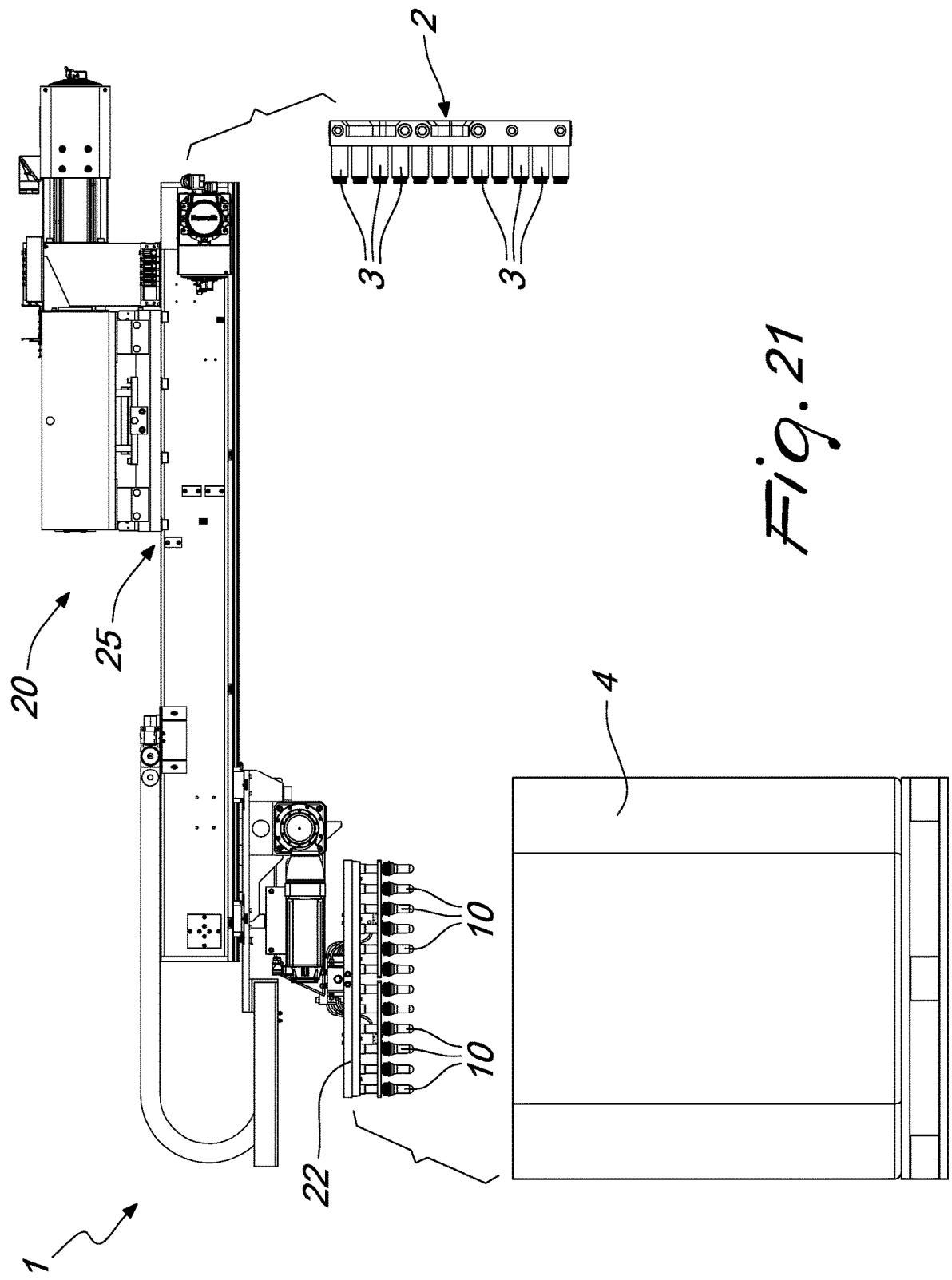
FIG. 21 is a side elevation view, from another point of view, of the device of FIG. 19 in the unloading step.

The present disclosure refers to a device, generally designated by the reference numeral 1, for unloading and storing preforms 10 for the production of containers made of plastics.

The unloading and storage device 1 comprises at least one cooling plate 2, which defines a plurality of receptacles 3 for respective preforms 10.

The device 1 is provided with means for transferring the still-hot preforms from an injection molding device, not shown in the figures, to the cooling plate 2.

According to the present disclosure, the device 1 comprises pick-up means 20, which are adapted to pick up the preforms 10 from the cooling plate 2 and place them inside at least one accommodation container 4.

At the practical level, the pick-up means 20 can comprise a robot selected, for example, among:
Cartesian robots;
cylindrical robots;
spherical robots;
SCARA robots;
articulated or anthropomorphic robots.

According to a practical embodiment, the pick-up means 20 comprise at least one Cartesian robot 24 (as shown in FIGS. 13 to 21).

Advantageously, as shown in FIGS. 1 to 12, the pick-up means 20 comprise an anthropomorphic robot 21.

Conveniently, the pick-up means 20 comprise a plate 22 that supports a plurality of supporting bodies 23 for a respective preform 10.

Advantageously, the supporting bodies 23 are arranged in a matrix.

With reference to the embodiment shown in the figures, the supporting bodies 23 comprise respective protrusions that are extended substantially at right angles to the plate 22.

In order to allow the unloading of the preforms 10, the protrusions are associated with at least one pusher body 24 to unload the preforms from the respective supporting body 23.

This or these pusher bodies 24 is/are movable, on command, substantially at right angles with respect to the direction of extension of the protrusions in order to abut against a portion of the preforms 10 and disengage them from said protrusions so as to allow their placement inside the accommodation container 4.

Conveniently, during the preform unloading step the plate 22 is arranged substantially parallel to the bottom of the accommodation container 4.

According to a particularly important aspect of the disclosure, the pick-up means 20 are adapted to unload the preforms 10 in an orderly manner into the accommodation container 4.

By way of example, the means for transferring the still-hot preforms from the injection molding device to the cooling plate 2 comprise a device for moving the cooling plate 2 with respect to the molding device in order to pick up directly the still-hot preforms from the molding device in the open condition.

In particular, the injection molding device is constituted by a first mold part and a second mold part which can move with respect to each other between a closure position, in which they cooperate in order to define cavities that correspond to the shape of the preform 10, and an opening position, in which the still-hot preforms 10 obtained by the injection process protrude at least partially from the first mold part so that they can be picked up from the receptacles 3 defined on the cooling plate 2.

In order to allow the preforms 10 to cool down enough, the cooling plate 2 is provided with a plurality of series or arrays of receptacles 3 that are mutually spaced in a manner that corresponds to the position of the preforms 10 obtained by the injection molding device.

Obviously, the supporting bodies 23 also are arranged on the plate 22 in a manner similar to the series of receptacles 3.

Advantageously, the device 1 according to the disclosure provides for the possibility that at least the container or containers 4 are arranged within a confinement region 30 in which a pressure that is higher than atmospheric pressure is provided.

This pressure higher than atmospheric pressure is, for example, obtained by means of a device 31 for injecting and withdrawing air, advantageously filtered, in and from the confinement region 30.

By keeping the containers 4 (and therefore the preforms 10 accommodated therein) in a confinement region 30 with pressure higher than atmospheric pressure the risk that dirt and/or impurities might in some way contaminate the preforms is reduced substantially.

Advantageously, the confinement region 30 comprises at least one opening that can be crossed by the pick-up means 20 during the operations for storing the preforms 10 in the container 4.

Conveniently, the opening is closed by an air curtain generated by a device 32 for producing an air flow.

Figure 22:
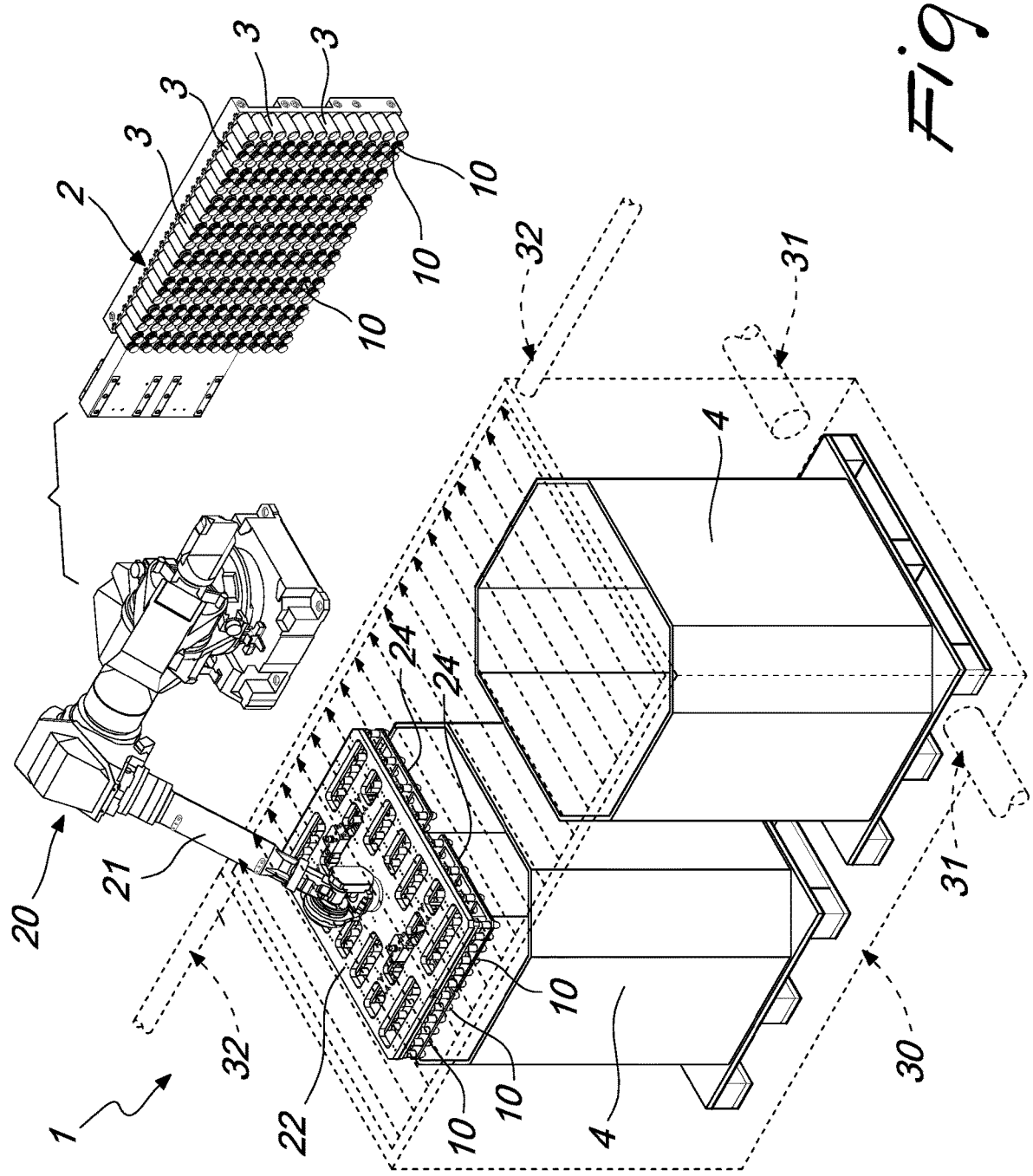
FIGS. 22 to 25 are perspective views of constructive variations of the device according to the disclosure.

With reference to the embodiment shown in FIG. 22, the confinement region 30 accommodates the container or containers 4.

Figure 23:
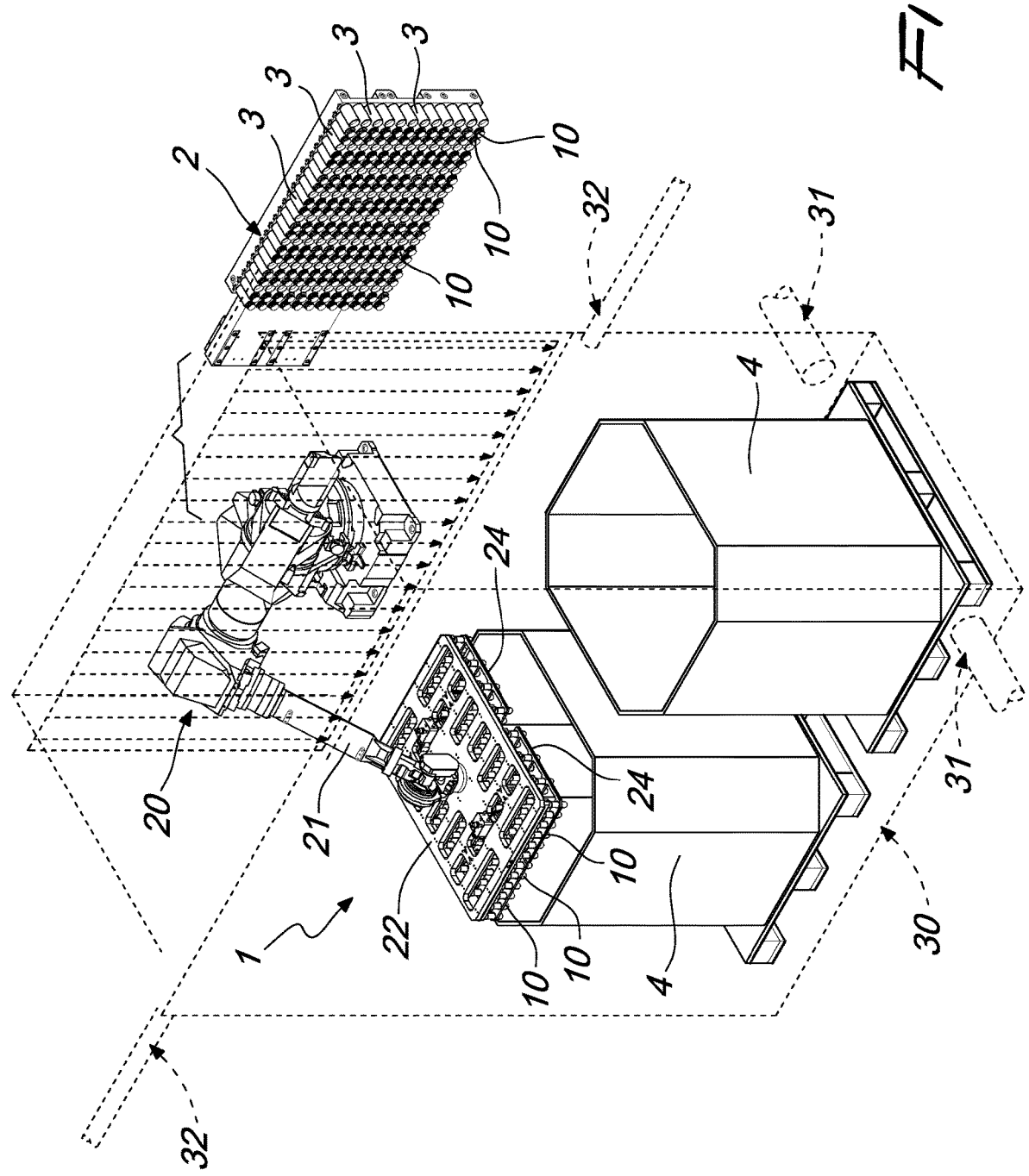

As an alternative, as shown in FIG. 23, the confinement region 30 accommodates the container or containers 4 and the pick-up means 20.

Figure 24:
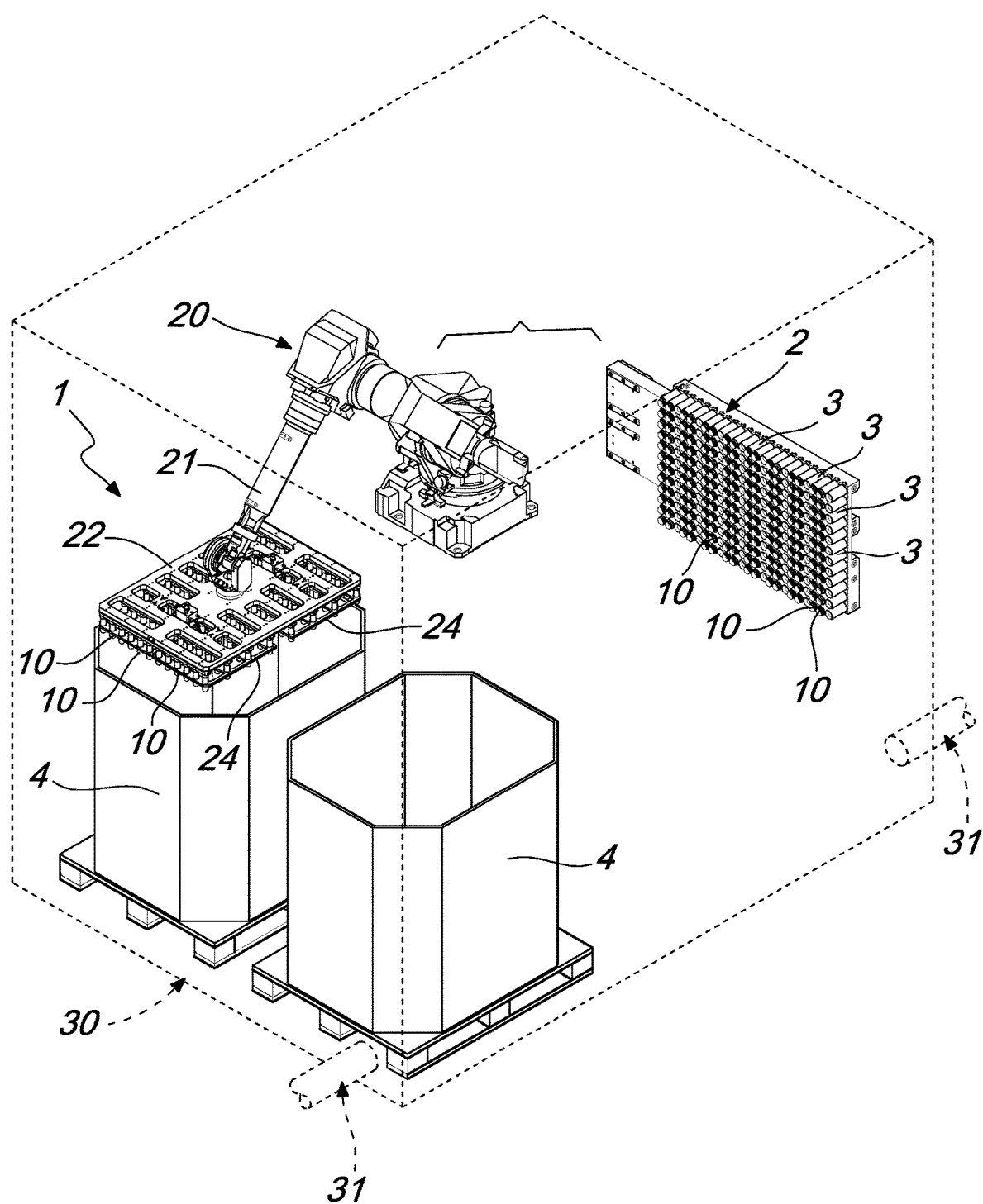

According to a further embodiment shown in FIG. 24, the confinement region 30 accommodates the container or containers 4, the pick-up means 20 and the cooling plate 2.

In some cases, the confinement region can have an opening that can be closed by means of a device other than an air curtain, such as for example a shutter device.

Figure 25:
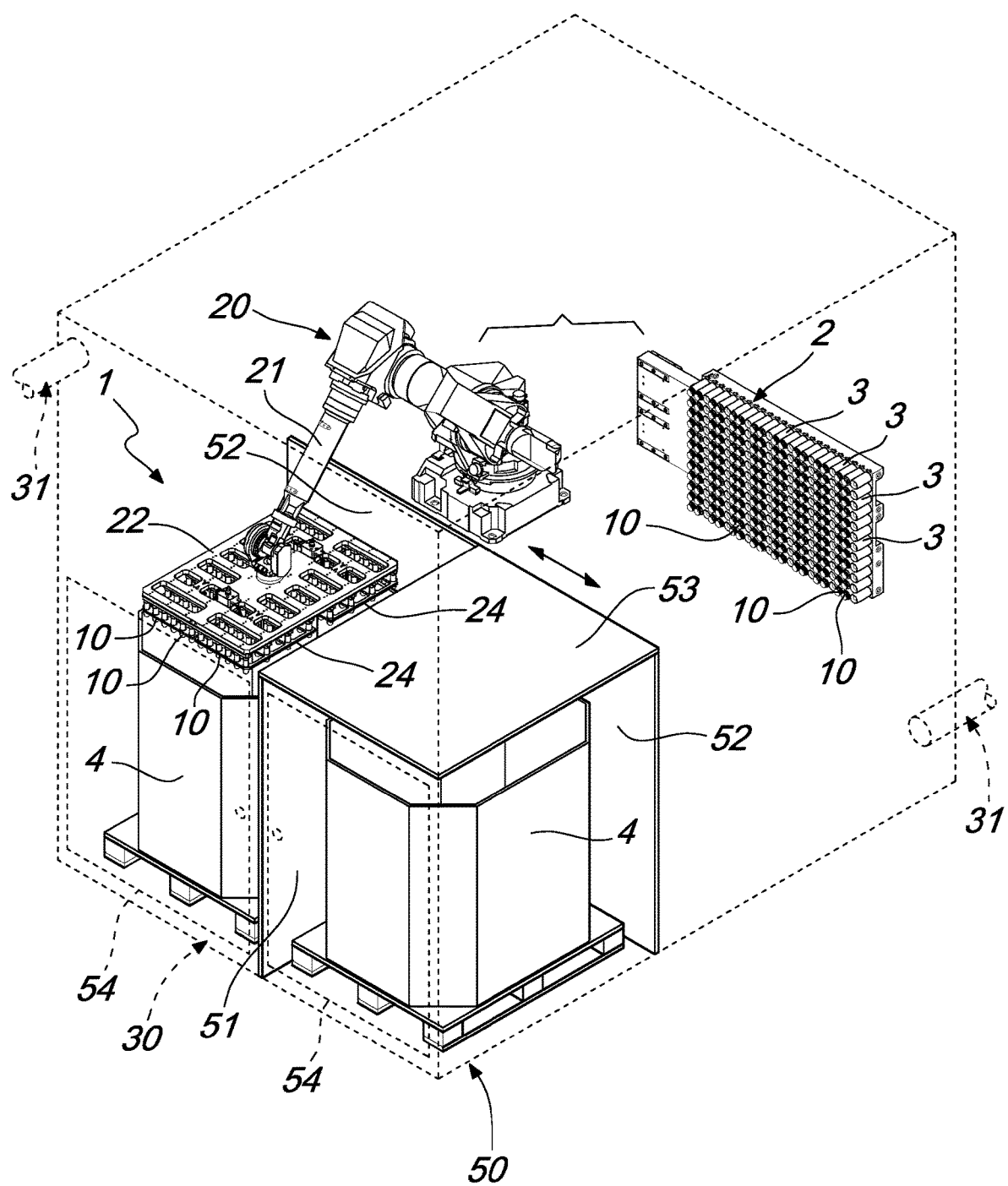

With reference to the constructive variation shown in FIG. 25, the device 1 can have means 50 for separating at least one container 4 from the confinement region 30.

Specifically, the separation means 50 are intended to separate the accommodation region of the container 4, when it is full, from the confinement region 30, so that its pick-up and replacement with a container 4 to be filled does not contaminate the confinement region 30.

By way of example, the separation means 50 can comprise at least one upper partition 53, which can be moved, on command, in order to arrange it above the access opening of the full container 4.

Advantageously, the separation means 50 have only one upper partition 53, which can move on a substantially horizontal plane in order to be arranged, in each instance, above the access opening of the container 4 to be unloaded.

Preferably, the separation means 50 have lateral partitions 51, 52.

Advantageously, there is at least one vertical dividing partition 51 arranged between the containers 4: conveniently, the vertical dividing partition 51 is fixed.

Preferably, there is at least one fixed or movable vertical partition 52 for lateral closure, and an access door 54, which is preferably associated with a respective container 4 and can be opened in order to be able to access the container to be unloaded when the fixed or movable partitions are arranged so as to isolate such container from the remaining part of the confinement region 30.

The separation means 50 can be associated, obviously, also with devices 1 that have different types of confinement regions 30 such as, for example, the ones shown in FIGS. 22 and 23.

Moreover, it is noted that in some embodiments the separation means 50 can define the shutter device intended to close the opening of the confinement region 30.

According to a further aspect, the present disclosure relates to a device 1 for unloading and storing preforms 10 for the production of containers made of plastics.

The device 1 comprises at least one cooling plate 2 that defines a plurality of receptacles 3 for respective preforms 10 and means for transferring the still-hot preforms from an injection molding device to the cooling plate 2.

The device 1, moreover, is provided with a device for transferring the preforms 10 from the cooling plate 2 to the container 4.

Such transfer device can comprise the pick-up means 20 described previously or a traditional device comprising, for example, belt conveyors.

Advantageously, the device provides for the possibility that at least the container or containers 4 is/are arranged within a confinement region 30 in which a pressure higher than atmospheric pressure is provided.

Such pressure higher than atmospheric pressure is, for example, obtained by means of a device 31 for injecting and extracting air, advantageously filtered, in and from the confinement region 30.

By keeping the containers 4 (and therefore the preforms 10 accommodated therein) in a confinement region 30 with a pressure higher than atmospheric pressure, the risk that dirt and/or impurities might in some way contaminate the preforms is reduced substantially.

Advantageously, the confinement region 30 comprises at least one opening that can be crossed by the transfer device during the operations for storing the preforms 10 in the container 4.

Conveniently, the opening is closed by an air curtain generated by an air flow generation device 32.

With reference to the embodiment shown in FIG. 22, the confinement region 30 accommodates the container or containers 4.

As an alternative, as shown in FIG. 23, the confinement region 30 accommodates the container or containers 4 and the pick-up means 20.

According to a further embodiment shown in FIG. 24, the confinement region 30 accommodates the container or containers 4, the pick-up means 20 and the cooling plate 2.

In some cases, the confinement region can have an opening that can be closed by means of a device other than an air curtain, such as for example a shutter device.

With reference to the constructive variation shown in FIG. 25, the device 1 can have means 50 for separating at least one container 4 from the confinement region 30.

Specifically, the separation means 50 are intended to separate the accommodation region of the container 4, when it is full, from the confinement region 30, so that its pick-up and replacement with a container 4 to be filled do not contaminate the confinement region 30.

By way of example, the separation means 50 can comprise at least one upper partition 53, which can move, on command, in order to be arranged above the access opening of the full container 4.

Advantageously, the separation means 50 have a single upper partition 53, which can move on a substantially horizontal plane in order to be arranged, in each instance, above the access opening of the container 4 to be unloaded.

Preferably, the separation means 50 have lateral partitions 51, 52.

Advantageously, there is at least one vertical dividing partition 51 arranged between the containers 4: conveniently, the vertical dividing partition 51 is fixed.

Preferably, there is at least one fixed or movable vertical lateral closure partition 52 and there is an access door 54, which is preferably associated with a respective container 4 and can be opened in order to be able to access the container 4 to be unloaded when the fixed or movable partitions are arranged so as to isolate said container from the remaining part of the confinement region 30.

The separation means 50 can be associated, obviously, also with devices 1 that have different types of confinement regions 30, such as, for example, the ones shown in FIGS. 22 and 23.

Moreover, it is noted that in some embodiments the separation means 50 can define the shutter device intended to close the opening of the confinement region 30.

Operation of the device 1 according to the disclosure is evidently clear from what has been described above.

In particular, at each molding cycle of the preforms by the injection molding device, the cooling plate 2 is arranged at the mold part that accommodates part of the still-hot preforms in order to transfer them into the series of receptacles 3.

While the molding device performs a new preform molding cycle, the cooling plate 2 moves away from said molding device and the pick-up means 20 proceed to pick up, from a series of receptacles 3, the respective preforms 10 in order to deposit them inside the accommodation container 4.

The cooling plate 2 is thus moved again near the molding device so that the series of receptacles, now emptied of the preforms, can receive the freshly formed preforms.

The devised solution allows a more orderly unloading of the preforms 10.

Moreover, the device according to the disclosure allows to reduce substantially the number of falls, rebounds and scrapings, or in any case of potential opportunities for damage to the preform independently of the temperature, with respect to the solutions commonly used with belt conveyance.

Traditional systems in fact entail a first fall onto a conveyor belt, the transfer of the preforms stacked thereon with the various preform-preform and/or preform-conveyor belt frictions, and also the last conveyor belt-storage container fall, which in traditional solutions can be improved only with the use of a further machine (soft drop) that "guides" the last fall of the preforms by entering the storage container with a sort of bucket.

The device according to the disclosure eliminates, moreover, one "handling" since with a single pass the preforms are transferred directly from the cooling plate to the container, with a clear reduction of the risk of damaging the preform.

Moreover, the release of the preforms within the container is far "gentler" than known solutions, since it is possible to enter the container directly with the plate that supports the preforms.

The individual characteristic presented with reference to general teachings or to particular embodiments can be all present in other embodiments or can replace characteristics in these embodiments.

The disclosure thus conceived is susceptible of numerous modifications and variations.

In practice, the materials used, so long as they are compatible with the specific use, as well as the shapes and dimensions, may be any according to requirements.

All the details may further be replaced with other technically equivalent elements.

The invention claimed is:

1. A device for unloading and storing preforms comprises at least one cooling plate that defines a plurality of receptacles for respective preforms and a transferring component configured to transfer the preforms from an injection molding device to said cooling plate, and further comprising a pick-up component adapted to pick up said preforms from said cooling plate and to place said preforms inside at least one accommodation container, wherein said pick-up component comprises a plate that supports a plurality of supporting bodies for a respective preform, wherein said supporting bodies comprise respective protrusions extended substantially at right angles with respect to said plate and are associated with at least one pusher body to unload the preforms from the respective supporting body, wherein the at least one pusher body is movable on command substantially at right angles with respect to a direction of extension of said protrusions in order to abut against a portion of the preforms and disengage the preforms from said protrusions so as to allow placement inside the at least one accommodation container.

2. The device according to claim 1, wherein said pick-up component comprises at least one robot selected within the group comprising:
   Cartesian robots;
   cylindrical robots;
   spherical robots;
   SCARA robots; and
   articulated or anthropomorphic robots.

3. The device according to claim 1, wherein said pick-up component comprises an anthropomorphic robot.

4. The device according to claim 1, wherein said supporting bodies are arranged in a matrix.

5. The device according to claim 1, wherein said pick-up component is adapted to unload said preforms in an orderly manner into said at least one accommodation container.

6. The device according to claim 1, wherein said transferring component comprises a device configured for moving said cooling plate with respect to said molding device in order to pick up directly the preforms from said molding device in an open condition.

7. The device according to claim 1, wherein at least said at least one accommodation container is arranged within a confinement region in which a pressure that is higher than atmospheric pressure is provided.

8. The device according to claim 7, wherein said confinement region comprises at least one opening that can be crossed by said pick-up component during the operations for storing the preforms in said at least one accommodation container, said at least one opening being closed by an air curtain.

9. The device according to claim 7, wherein said confinement region accommodates said at least one accommodation container.

10. The device according to claim 7, wherein said confinement region accommodates said at least one accommodation container and said pick-up component.

11. The device according to claim 7, wherein said confinement region accommodates said at least one accommodation container, said pick-up component and said cooling plate.

12. The device according to claim 7, further comprising a separating component configured for separating at least one separation container from said confinement region.

13. The device according to claim 12, wherein said separating component is configured to separate the accommodation region of at least one accommodation container, when it is full, from said confinement region, so that its pick-up and/or replacement with a container to be filled does not contaminate said confinement region.

* * * * *